US012224779B2

United States Patent
Ouchi et al.

(10) Patent No.: US 12,224,779 B2
(45) Date of Patent: Feb. 11, 2025

(54) TRANSMITTER, RECEIVER, TRANSMISSION METHOD, RECEPTION METHOD, AND NON-TRANSITORY COMPUTER READABLE STORAGE MEDIUM FOR PERFORMING BEAMFORMING IN WIRELESS TRANSMISSION

(71) Applicant: Panasonic Holdings Corporation, Osaka (JP)

(72) Inventors: Mikihiro Ouchi, Osaka (JP); Tomohiro Kimura, Osaka (JP); Yusuke Chinda, Miyagi (JP); Kazuhiko Kikuchi, Miyagi (JP)

(73) Assignee: Panasonic Holdings Corporation, Osaka (JP)

( * ) Notice: Subject to any disclaimer, the term of this patent is extended or adjusted under 35 U.S.C. 154(b) by 264 days.

(21) Appl. No.: 18/066,210

(22) Filed: Dec. 14, 2022

(65) Prior Publication Data

US 2023/0198552 A1    Jun. 22, 2023

(30) Foreign Application Priority Data

Dec. 20, 2021    (JP) .................................. 2021-205966

(51) Int. Cl.
*H04B 1/00*      (2006.01)
*H04B 17/11*     (2015.01)

(52) U.S. Cl.
CPC ........... *H04B 1/0007* (2013.01); *H04B 17/11* (2015.01)

(58) Field of Classification Search
CPC ...... H04B 1/0007; H04B 17/11; H04B 17/12; H04B 17/21; H04B 17/364
(Continued)

(56) References Cited

U.S. PATENT DOCUMENTS 10,911,161 B2 *   2/2021   Oswal ................. H04B 1/0475
2004/0171408 A1 * 9/2004   Maruta ................. H04B 17/14
                                                          342/359
(Continued)

FOREIGN PATENT DOCUMENTS

JP    2010213217 A    9/2010
JP    2010540894 A    12/2010
(Continued)

OTHER PUBLICATIONS

Ouchi et al., "Development of 38GHz-band Wireless Communication System Using High Altitude Platform Station (HAPS) for 5G Network—Study on full digital beamforming for HAPS with base station on-board," 2021 Society Conference of the Institute of Electronics, Information and Communication Engineers, Sep. 14-17, 2021, pp. 161. (with English translation).

(Continued)

*Primary Examiner* — Don N Vo
(74) *Attorney, Agent, or Firm* — Seed IP Law Group LLP

(57) ABSTRACT

A transmission method is performed by a transmitter including antenna elements. The transmission method includes: generating a digital calibration signal; performing digital-to-analog conversion on second digital signals to generate first analog signals, the second digital signals being obtained by adding the digital calibration signal to each of a plurality of first digital signals each corresponding to respective one of the antenna elements; performing analog-to-digital conversion on the first analog signals to generate third digital signals each corresponding to respective one of the antenna elements, the first analog signals each passing through respective one of the antenna elements; performing correlation calculation between the digital calibration signal and each of the third digital signals to calculate transmission delay characteristics each corresponding to respective one of the antenna elements; calculating transmission delay correc- (Continued)

tion amounts based on the transmission delay characteristics; and correcting the transmission delay characteristics based on the transmission delay correction amounts.

18 Claims, 14 Drawing Sheets

(58) Field of Classification Search
USPC .................................................. 455/552.1
See application file for complete search history.

(56) References Cited

U.S. PATENT DOCUMENTS

| | | | |
|---|---|---|---|
| 2020/0067466 A1* | 2/2020 | Kushnir | H03F 3/245 |
| 2022/0321181 A1* | 10/2022 | Hadani | H04B 7/024 |
| 2023/0239013 A1* | 7/2023 | Kuriyama | H04B 7/0456 |
| | | | 375/267 |

FOREIGN PATENT DOCUMENTS

| | | |
|---|---|---|
| JP | 2012242107 A | 12/2012 |
| WO | wo 2009040038 A1 | 4/2009 |

OTHER PUBLICATIONS

Suyama et al., "5G Multi-antenna Technology," NTT Docomo Technical Journal, 17(4):29-39, Apr. 2016. (with English translation).

Suzuki et al., "Development of 38GHz-band Wireless Communication System Using High Altitude Platform Station (HAPS) for 5G Network—Study on broadband backhaul communication link for 5G network," 2021 General Conference of the Institute of Electronics, Information and Communication Engineers (IEICE), Mar. 9-12, 2021, pp. 205. (with English translation).

* cited by examiner (a) CHANGE IN PEAK CORRELATION VALUE DUE TO DELAY (b) CHANGE IN E-L CORRELATION VALUE DUE TO DELAY

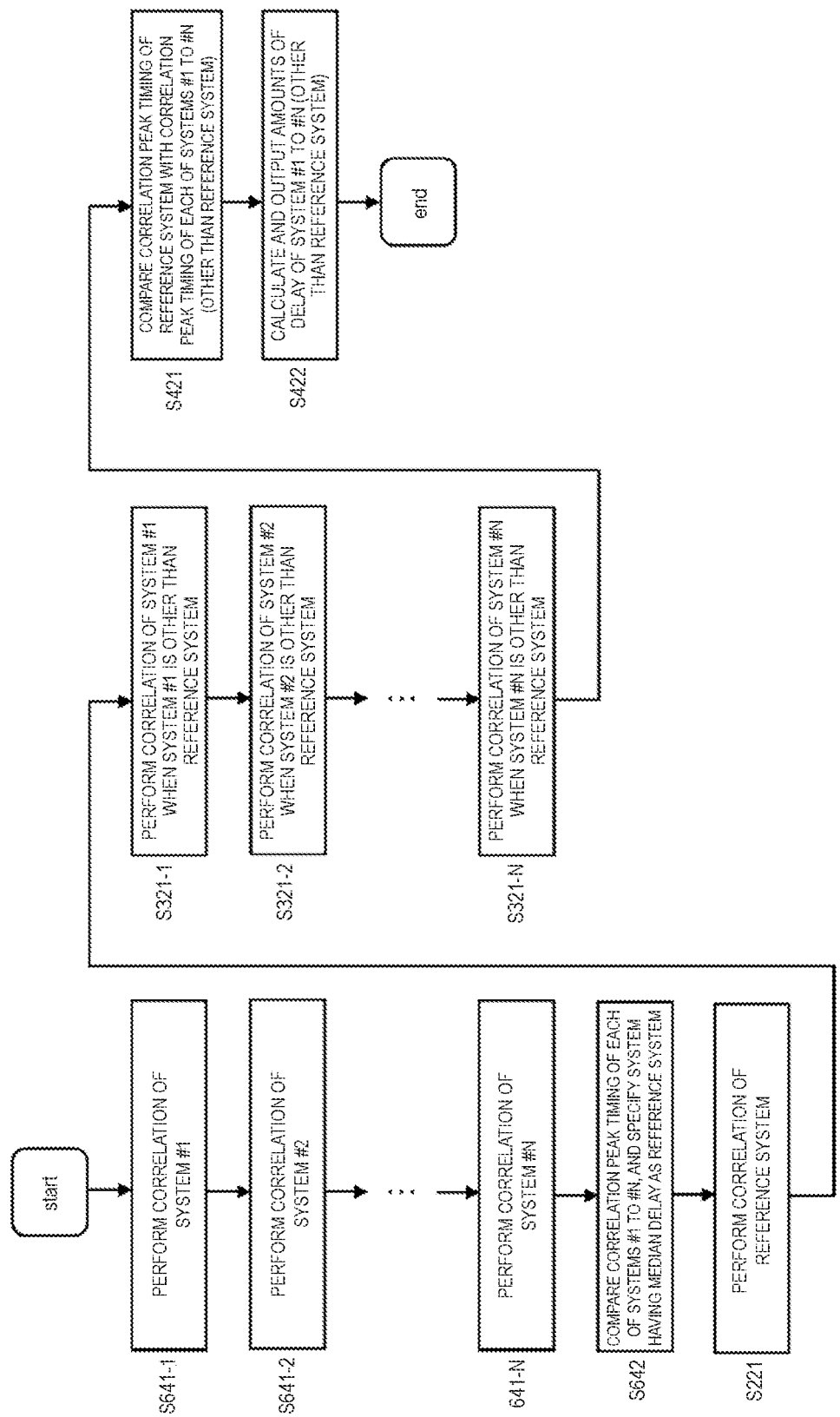

TRANSMITTER, RECEIVER, TRANSMISSION METHOD, RECEPTION METHOD, AND NON-TRANSITORY COMPUTER READABLE STORAGE MEDIUM FOR PERFORMING BEAMFORMING IN WIRELESS TRANSMISSION

BACKGROUND

1. Technical Field

The present disclosure relates to a transmitter, a receiver, a transmission method, a reception method, and a non-transitory computer readable storage medium, and more particularly, to a transmitter, a receiver, a transmission method, a reception method, and a non-transitory computer readable storage medium for performing beamforming in wireless transmission.

2. Description of the Related Art

One of main technologies of the 5th Generation (5G) mobile communication system include a 5G multi-antenna technology (e.g., Suyama et al., "5G multi-antenna technology", NTT DOCOMO Technical Journal, Vol. 23 No. 4, pp. 30-39, January 2016, which is referred to below as NPL 1). The 5G multi-antenna technology compensates propagation loss in a high frequency band by beamforming that adaptively controls antenna directivity using a super multi-element antenna. The beamforming is roughly classified into three types below (e.g., Chapter 3.3 of NPL 1).
(1) Full digital beamforming
(2) Full analog beamforming
(3) Hybrid beamforming
(1) The full digital beamforming is excellent in performance due to digital precoding processing, but requires as many digital to analog converters (DACs) and up converters (UCs) as antenna elements. Thus, the full digital beamforming is expensive in a high frequency band, and has comparatively high power consumption.
(2) The full analog beamforming requires no digital precoding processing and thus has the simplest circuit configuration, but requires reduction of beams in number and generation of narrow beams to maintain orthogonality between beams.
(3) The hybrid beamforming is performed with a combination of digital and analog ways, and thus has performance and complexity of a circuit configuration that are both intermediate between those of the full digital beamforming of the item (1) and those of the full analog beamforming of the item (2).

Regarding commercialization of a high-altitude platform station (HAPS), environmental improvement and technical development have progressed internationally, and thus its spread and expansion are expected. In particular, a stationary communication system using HAPS is highly expected to achieve securing of a redundant route of a backhaul line via the sky. An HAPS system with high-speed and large-capacity is expected to be achieved in cooperation with a 5G network in a 38 GHz band allocated to the HAPS in the World Radio Communication Conference in 2019 (WRC-19) (e.g., Suzuki et al. "Development of 38 GHz-band wireless communication system using high altitude platform (HAPS) for 5G Network—Study on broadband backhaul communication link for 5G network", the Institute of Electronics, Information and Communication Engineers (IEICE) General Conference, 2021, B-3-1, March 2021, which is referred to below as NPL 2). The HAPS flies in the stratosphere around an altitude of 20 km while circling around the circumference, and thus is followed by performing beamforming with a ground station. The HAPS requires a super multi-element antenna to compensate propagation loss in a high frequency band.

The beamforming in each of the items (1) to (3) above has a variation in analog circuit characteristics among elements in phase (delay) control of each antenna element, so that calibration among elements is important. In particular, the stratosphere around the altitude of 20 km where the HAPS stays has a severe environment with a very low temperature of −70° C. and a $\frac{1}{10}$ atmospheric pressure, so that the calibration among elements requires a real-time capability and a high-speed.

JP 2010-540894 A discloses calibration among elements in which a phase characteristic for each antenna element is calculated by transmitting a main signal to which a pseudorandom sequence is added from an array antenna and receiving the main signal with a reception array antenna to acquire a correlation between the pseudorandom sequence identical to that on the transmission side and the received main signal. This enables real-time phase calibration without stopping the main signal.

In contrast, when a broadband signal is used as in NPL 2, a delay variation between elements is likely to cause an in-band phase inclination, which adversely affects beamforming performance. Thus, to maintain the beamforming performance, calibration among elements is required to be performed for even a delay variation of less than one sample. JP 2010-213217 A (referred to below as PTL 2) discloses the amount of delay correction of each element that is calculated to suppress a settable range of the amount of delay correction of each element by sequentially injecting a calibration signal into transmission and reception circuits of each element, and using a delay measurement result of the transmission and reception circuits of each element obtained by correlation with the calibration signal.

SUMMARY

As described above, a stationary communication system using the HAPS is expected to achieve high speed and large capacity in the 38 GHz band. Unfortunately, using the 38 GHz band with a large rainfall attenuation requires a use of a super multi-element antenna to compensate propagation loss in a high frequency band, and further increase of the number of elements to secure a sufficient margin for the rainfall attenuation. This increases time required for calibration in proportion to the number of elements. PTL 2 requires the amount of delay correction of each element to be calculated using the delay measurement result of the transmission and reception circuits of each element because the delay measurement by correlation is performed after transmission and reception calibration signals each pass through a delay element that performs delay correction in the transmission and reception circuits for the main signal. Thus, the time required for delay calibration among elements increases in proportion to twice the number of elements.

Non-limiting examples of the present disclosure contribute to providing a transmitter, a receiver, a transmission method, and a reception method, which are capable of achieving high-performance beamforming.

A transmitter according to an exemplary embodiment of the present disclosure includes: a plurality of antenna elements; a calibration signal generator which, in operation, generates a digital calibration signal; a transmission processing execution unit which, in operation, performs transmission processing including digital-to-analog conversion on second digital signals to generate first analog signals, the second digital signals being obtained by adding the digital calibration signal to each of a plurality of first digital signals, the first digital signals each corresponding to respective one of the antenna elements; a reception processing execution unit which, in operation, performs reception processing including analog-to-digital conversion on the first analog signals to generate third digital signals each corresponding to respective one of the antenna elements, the first analog signals each passing through respective one of the antenna elements; a transmission characteristics calculator which, in operation, performs correlation calculation between the digital calibration signal and each of the third digital signals to calculate transmission delay characteristics each corresponding to respective one of the antenna elements and which, in operation, calculates transmission delay correction amounts based on the transmission delay characteristics, each of the transmission delay correction amounts corresponding to respective one of the antenna elements; and a transmission characteristics corrector which, in operation, corrects the transmission delay characteristics based on the transmission delay correction amounts.

A receiver according to an exemplary embodiment of the present disclosure includes: a plurality of antenna elements; a calibration signal generator which, in operation, generates a digital calibration signal; a transmission processing execution unit which, in operation, performs transmission processing including digital-to-analog conversion on the digital calibration signal to generate a first analog signal; a reception processing execution unit which, in operation, performs reception processing including analog-to-digital conversion on third analog signals to generate first digital signals each corresponding to respective one of the antenna elements, the third analog signals being obtained by adding the first analog signal to each of a plurality of second analog signals, the second analog signals each received via corresponding one of the antenna elements; a reception characteristics calculator which, in operation, performs correlation calculation between the digital calibration signal and each of the first digital signals to calculate reception delay characteristics each corresponding to respective one of the antenna elements and which, in operation, calculates reception delay correction amounts based on the reception delay characteristics, each of the reception delay correction amounts corresponding to respective one of the antenna elements; and a reception characteristics corrector which, in operation, corrects the reception delay characteristics based on the reception delay correction amounts.

A transmission method according to an exemplary embodiment of the present disclosure is performed by a transmitter including a plurality of antenna elements. The transmission method includes: generating a digital calibration signal; performing transmission processing including digital-to-analog conversion on second digital signals to generate first analog signals, the second digital signals being obtained by adding the digital calibration signal to each of a plurality of first digital signals, the first digital signals each corresponding to respective one of the antenna elements; performing reception processing including analog-to-digital conversion on the first analog signals to generate third digital signals each corresponding to respective one of the antenna elements, the first analog signals each passing through respective one of the antenna elements; performing correlation calculation between the digital calibration signal and each of the third digital signals to calculate transmission delay characteristics each corresponding to respective one of the antenna elements; calculating transmission delay correction amounts based on the transmission delay characteristics, each of the transmission delay correction amounts corresponding to respective one of the antenna elements; and correcting the transmission delay characteristics based on the transmission delay correction amounts.

A reception method according to an exemplary embodiment of the present disclosure is performed by a receiver including a plurality of antenna elements. The reception method includes: generating a digital calibration signal; performing transmission processing including digital-to-analog conversion on the digital calibration signal to generate a first analog signal; performing reception processing including analog-to-digital conversion on third analog signals to generate first digital signals each corresponding to respective one of the antenna elements, the third analog signals being obtained by adding the first analog signal to each of a plurality of second analog signals, the second analog signals each received via corresponding one of the antenna elements; performing correlation calculation between the digital calibration signal and each of the first digital signals to calculate reception delay characteristics each corresponding to respective one of the antenna elements; calculating reception delay correction amounts based on the reception delay characteristics, each of the reception delay correction amounts corresponding to respective one of the antenna elements; and correcting the reception delay characteristics based on the reception delay correction amounts.

It should be noted that general or specific embodiments may be implemented as a system, a method, an integrated circuit, a computer program, a storage medium, or any selective combination thereof.

An exemplary embodiment of the present disclosure enables the delay calibration to be performed by a single correlation (E-L correlation value) for each of the antenna elements for transmission (or reception) after the transmission calibration signal (or the reception calibration signal) passes through the reception processing execution unit (or the transmission processing execution unit) dedicated to the calibration signal, so that high-performance beamforming can be achieved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 13 is a diagram illustrating yet another example of a flowchart of delay calibration among antenna elements (systems) in transmission or reception according to an eighth exemplary embodiment of the present disclosure.

DETAILED DESCRIPTIONS

Hereinafter, exemplary embodiments of the present disclosure will be described in detail with reference to the drawings as appropriate. However, unnecessarily details may not be described. For example, details of already well-known matters and duplication of substantially identical configurations may not be described. This is to avoid unnecessary redundancy of description below and to facilitate understanding of those skilled in the art.

The accompanying drawings and the description below are provided for those skilled in the art to fully understand the present disclosure, and are not intended to limit the subject matter described in the scope of claims.

First Exemplary Embodiment

Figure 1:
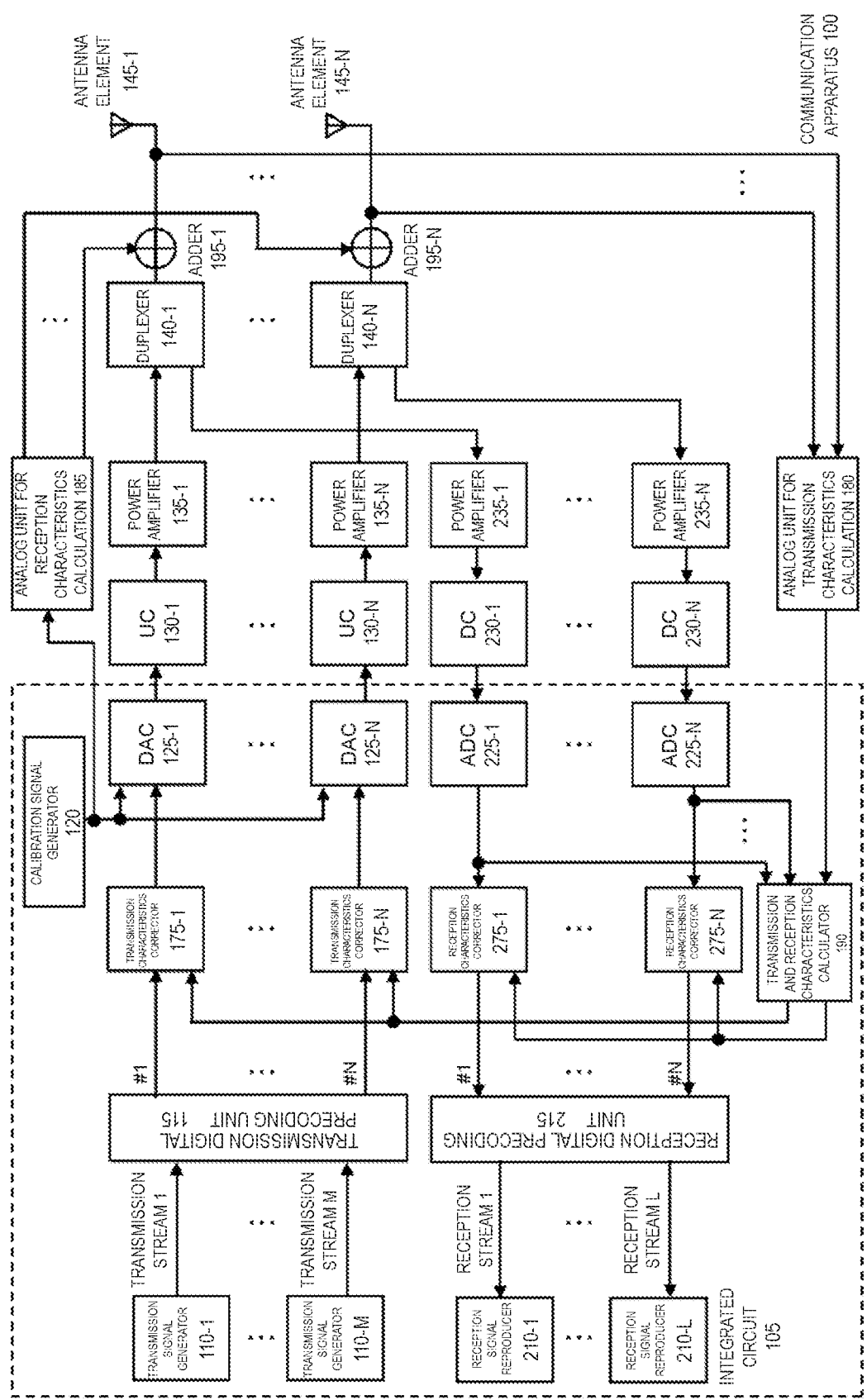
FIG. 1 is a diagram illustrating an example of a configuration of a communication apparatus according to a first exemplary embodiment of the present disclosure.

FIG. 1 is a diagram illustrating an example of a configuration of communication apparatus 100 according to a first exemplary embodiment of the present disclosure. Communication apparatus 100 includes M transmission signal generators 110-1 to 110-M, transmission digital precoding unit 115, N transmission characteristics correctors 175-1 to 175-N, a calibration signal generator 120, N DACs 125-1 to 125-N, N UCs 130-1 to 130-N, N power amplifiers 135-1 to 135-N, N duplexers 140-1 to 140-N, N antenna elements 145-1 to 145-N, a analog unit for transmission characteristics calculation 180, a analog unit for reception characteristics calculation 185, a transmission and reception characteristics calculator 190, N adders 195-1 to 195-N, L reception signal reproducers 210-1 to 210-L, a reception digital precoding unit 215, N reception characteristics correctors 275-1 to 275-N, N analog-to-digital converters (ADCs) 225-1 to 225-N, N down converters (DC) 230-1 to 230-N, and N power amplifiers 235-1 to 235-N. Communication apparatus 100 may include components that perform digital processing as integrated circuit 105. Examples of the components that perform the digital processing include transmission signal generator 110-1 to 110-M, transmission digital precoding unit 115, calibration signal generator 120, DACs 125-1 to 125-N, reception signal reproducers 210-1 to 210-L, reception digital precoding unit 215, ADCs 225-1 to 225-N, transmission characteristics correctors 175-1 to 175-N, transmission and reception characteristics calculator 190, and reception characteristics correctors 275-1 to 275-N. Integrated circuit 105 may include not only components that perform the digital processing but also some or all of components that perform analog processing.

Hereinafter, operation of communication apparatus 100 of FIG. 1 on a transmission side will be described.

Transmission signal generators 110-1 to 110-M generate transmission streams 1 to M, respectively, and output the transmission streams 1 to M to transmission digital precoding unit 115.

Transmission digital precoding unit 115 performs digital precoding for beamforming on M inputs (transmission streams 1 to M), generates N digital signals (main signals) corresponding to respective N antenna elements, and outputs the N digital signals to corresponding transmission characteristics correctors 175-1 to 175-N.

Transmission characteristics correctors 175-1 to 175-N each cause a storage unit (not illustrated) to store the amount of transmission characteristics correction (delay) indicated by a signal on amount of transmission characteristics correction received from transmission and reception characteristics calculator 190. Alternatively, the amount of transmission characteristics correction (delay) may be stored in the storage unit (not illustrated) by transmission and reception characteristics calculator 190. Transmission characteristics correctors 175-1 to 175-N each correct characteristics of the digital signal (main signal) received from transmission digital precoding unit 115 based on the amount of transmission characteristics correction (delay) indicated by the signal on amount of transmission characteristics correction to perform calibration among antenna elements. Then, transmission characteristics correctors 175-1 to 175-N output the calibrated digital signals to DACs 125-1 to 125-N, respectively. When preprocessing for performing the calibration among antenna elements is performed, the N digital signals (main signals) pass through corresponding transmission characteristics correctors 175-1 to 175-N without being processed by transmission characteristics correctors 175-1 to 175-N. Unless otherwise specified, a case where the preprocessing for performing calibration among antenna elements (i.e., correction by transmission characteristics correctors 175-1 to 175-N) is performed will be described below.

Calibration signal generator 120 generates a calibration signal at a low power level and outputs the calibration signal to DACs 125-1 to 125-N. Although not illustrated, calibration signal generator 120 also outputs the calibration signal to transmission and reception characteristics calculator 190. Examples of the calibration signal include a pseudorandom sequence in which 0 and 1 are generated with approximately equal probability, such as an M sequence or a Gold sequence.

Each of DACs 125-1 to 125-N adds the calibration signal received from calibration signal generator 120 to the main signal received from corresponding one of transmission characteristics correctors 175-1 to 175-N to convert the digital signal into an analog signal, and outputs the analog signal to corresponding one of UCs 130-1 to 130-N.

Each of UCs 130-1 to 130-N up-converts the analog signal received from the corresponding one of DACs 125-1 to 125-N into a transmission frequency band, and outputs the up-converted signal to corresponding one of power amplifiers 135-1 to 135-N.

Each of power amplifiers 135-1 to 135-N amplifies power of the up-converted analog signal received from the corresponding one of power amplifiers 135-1 to 135-N and outputs the amplified up-converted analog signal. Each of the analog signals output from respective power amplifiers 135-1 to 135-N passes through corresponding one of duplexers 140-1 to 140-N and corresponding one of adders 195-1 to 195-N, and is input to corresponding one of N antenna elements 145-1 to 145-N as a transmission signal. Then, the transmission signal input to the corresponding one of N antenna elements 145-1 to 145-N (i.e., the transmission signal that passes through the corresponding one of N antenna elements 145-1 to 145-N) is input to analog unit for transmission characteristics calculation 180 for processing described later with analog unit for transmission characteristics calculation 180.

DACs 125-1 to 125-N, UCs 130-1 to 130-N, and power amplifiers 135-1 to 135-N perform transmission processing including at least DA conversion on corresponding digital signals obtained by adding the calibration signal to the main signals to generate analog signals.

The main signal is an example of a first digital signal in the transmitter and the transmission method according to the present disclosure. The digital signal obtained by adding the calibration signal to the main signal is an example of a second digital signal in the transmitter and the transmission method according to the present disclosure. The analog signal generated after the transmission processing is performed is an example of a first analog signal in the transmitter and the transmission method according to the present disclosure. At least DACs 125-1 to 125-N, or in some cases including UCs 130-1 to 130-N and power amplifiers 135-1 to 135-N, are an example of a transmission processing execution unit in in the transmitter and the transmission method according to the present disclosure.

Analog unit for transmission characteristics calculation 180 performs reception processing such as down-conversion and AD conversion on the analog transmission signals received from N antenna elements 145-1 to 145-N, and outputs the digital signals after the reception processing to transmission and reception characteristics calculator 190. When transmission and reception are different in frequency in communication apparatus 100, only a signal on a transmission side is output from analog unit for transmission characteristics calculation 180 and input to transmission and reception characteristics calculator 190.

Transmission and reception characteristics calculator 190 calculates transmission characteristics using the digital signals received from analog unit for transmission characteristics calculation 180.

As described above, after the transmission calibration signal passes through the reception circuit (the analog unit for transmission characteristics calculation 180) dedicated to a calibration signal, delay measurement by correlation is performed. That is, the delay measurement by correlation is performed with the transmission calibration signal that does not pass through a delay element in the reception circuit for the main signal, unlike PTL 2.

Figure 2:
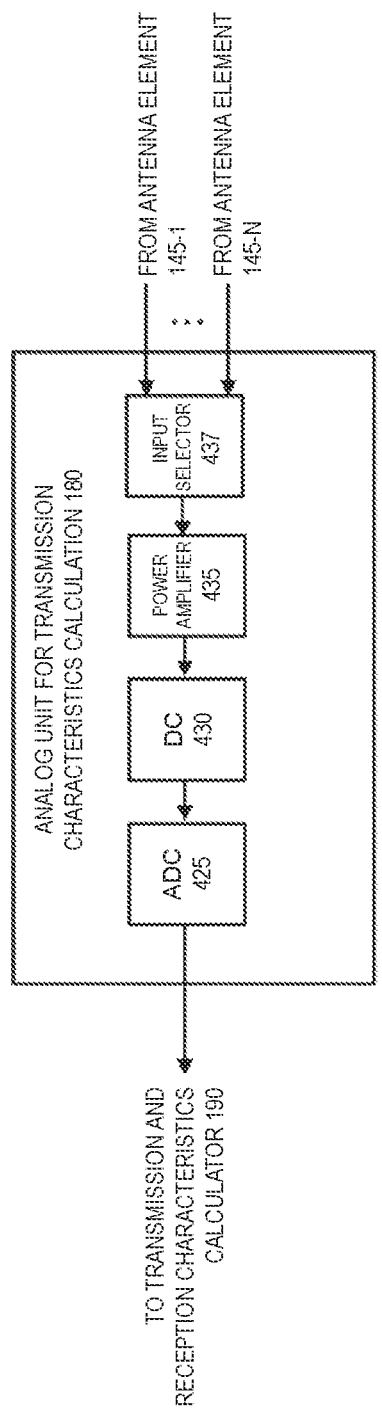
FIG. 2 is a diagram illustrating an example of a configuration of a analog unit for transmission characteristics calculation according to the first exemplary embodiment of the present disclosure.

FIG. 2 is a diagram illustrating an example of a configuration of analog unit for transmission characteristics calculation 180. Analog unit for transmission characteristics calculation 180 includes an ADC 425, a DC 430, a power amplifier 435, and an input selector 437.

Input selector 437 sequentially selects one of N antenna elements 145-1 to 145-N to receive an analog signal from the selected antenna element, and outputs the analog signal to power amplifier 435.

Power amplifier 435 amplifies power of the analog signal received from input selector 437 outputs the amplified analog signal to DC 430.

As with DCs 230-1 to 230-N, DC 430 down-converts the analog signal received from power amplifier 435 from a reception frequency band and outputs the analog signal to ADC 425.

ADC 425 converts the analog signal received from DC 430 into a digital signal and outputs the digital signal to transmission and reception characteristics calculator 190.

DC 430, ADC 425, input selector 437, and power amplifier 435 perform reception processing including at least AD conversion on the analog signal received via N antenna elements 145-1 to 145-N, and generate a digital signal including a calibration signal (pseudorandom sequence).

The digital signal above is an example of a third digital signal in the transmitter and the transmission method according to the present disclosure. At least DC 430, or in some cases including ADC 425, input selector 437, and power amplifier 435, i.e., analog unit for transmission characteristics calculation 180, is an example of a reception processing execution unit or a first reception processing execution unit in the transmitter and the transmission method according to the present disclosure.

When the preprocessing for performing calibration among antenna elements has already been performed, i.e., when the N digital signals (main signals) from transmission digital precoding unit 115 are processed and transmitted by transmission characteristics correctors 175-1 to 175-N, details of the preprocessing are not described. In this case, digital signals subjected to transmission characteristics correction corresponding to corresponding N antenna elements 145-1 to 145-N for transmission from N antenna elements 145-1 to 145-N are finally input to corresponding N antenna elements 145-1 to 145-N via DACs 125-1 to 125-N, UCs 130-1 to 130-N, power amplifiers 135-1 to 135-N, and duplexers 140-1 to 140-N described above, respectively.

The digital signals subjected to the transmission characteristics correction are each an example of the second digital signal in the receiver and the reception method according to the present disclosure. At least DACs 125-1 to 125-N, or in some cases including UCs 130-1 to 130-N and power amplifiers 135-1 to 135-N, are each an example of a second transmission processing execution unit in the receiver and the reception method according to the present disclosure.

Figure 3:
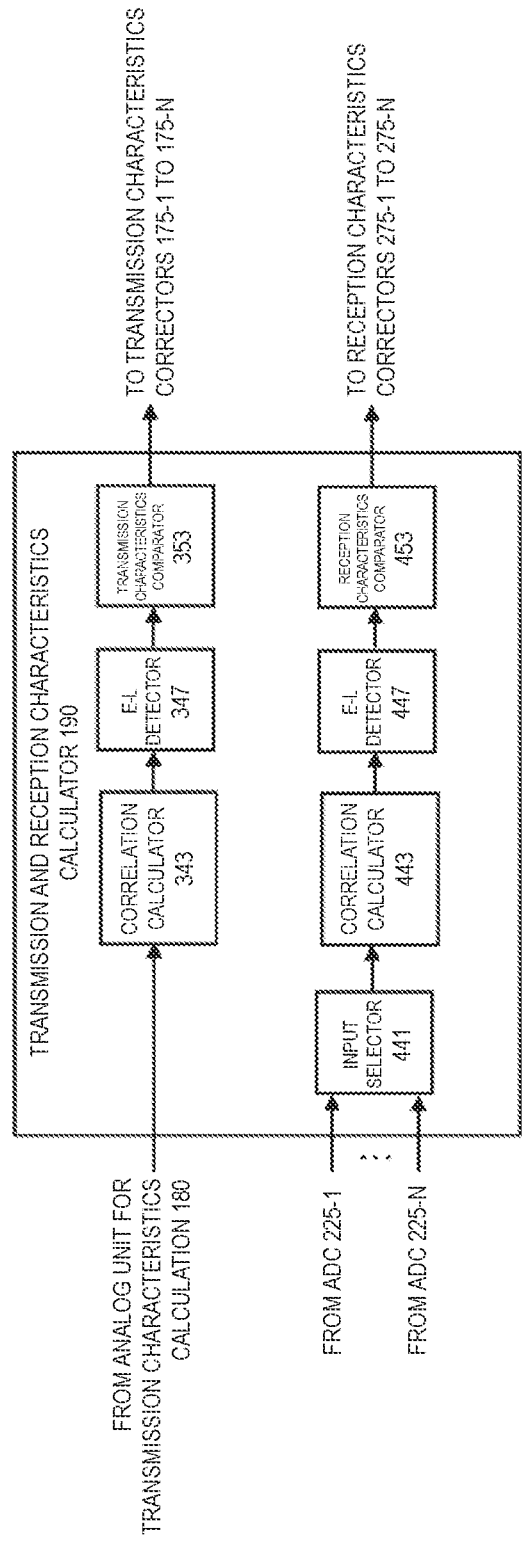
FIG. 3 is a diagram illustrating an example of a configuration of a transmission and reception characteristics calculator in the first exemplary embodiment of the present disclosure.

FIG. 3 is a diagram illustrating an example of a configuration of transmission and reception characteristics calculator 190. Transmission and reception characteristics calculator 190 includes input selector 441, correlation calculators 343 and 443, early-late (E-L) detectors 347 and 447, transmission characteristics comparator 353, and reception characteristics comparator 453.

Correlation calculator 343 performs a correlation calculation between the digital signals converted from the analog signals having passed through respective antenna elements 145-1 to 145-N by analog unit for transmission characteristics calculation 180 and received from analog unit for transmission characteristics calculation 180, and the calibration signal (pseudorandom sequence) generated by calibration signal generator 120 and received from calibration signal generator 120.

E-L detector 347 detects a peak value in one period in the pseudorandom sequence and performs correlation calculation for multiple periods as necessary, thereby obtaining a desired correlation gain. E-L detector 347 also outputs an E-L correlation value, which is a result obtained by subtracting a correlation value after one sample from the peak value from a correlation value before one period from the peak value, to transmission characteristics comparator 353 as transmission characteristics.

The output from analog unit for transmission characteristics calculation 180 is sequentially switched to each of N antenna elements 145-1 to 145-N, so that transmission characteristics comparator 353 compares characteristics of each of N antenna elements 145-1 to 145-N received from E-L detector 347. Then, transmission characteristics comparator 353 calculates (or determines) the amount of transmission characteristics correction of each of N antenna elements 145-1 to 145-N to allow all the antenna elements to be identical in characteristics, and generates signal on amount of transmission characteristics corrections each indicating the amount of transmission characteristics correction to output the signal on amount of transmission characteristics corrections to corresponding transmission characteristics correctors 175-1 to 175-N.

Transmission and reception characteristics calculator 190 is an example of the transmission characteristics calculator in the transmitter and the transmission method according to the present disclosure.

Figure 4A:
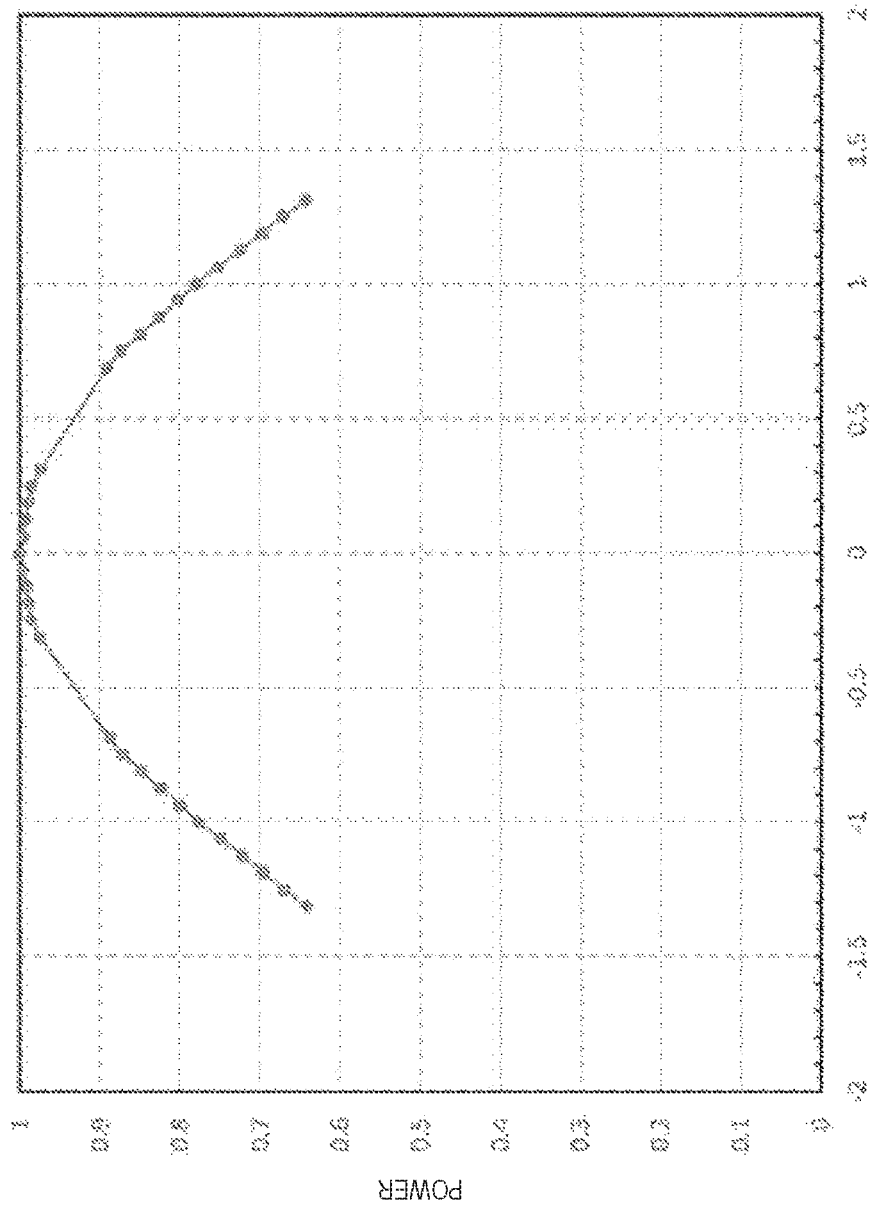
FIG. 4A is a diagram illustrating an example of a result obtained by simulation of change in peak correlation value due to a delay and change in E-L correlation value due to the delay.
Figure 4B:
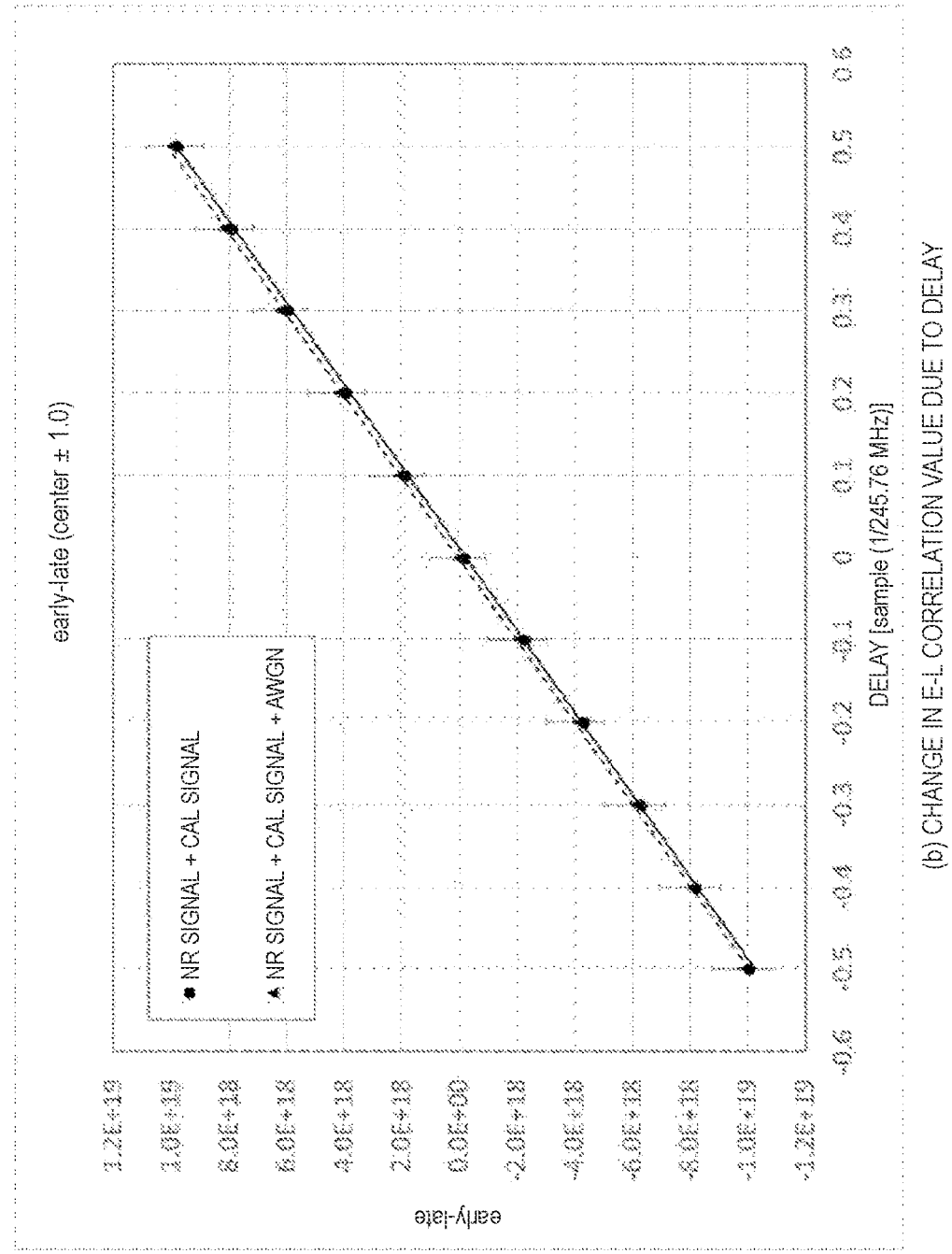
FIG. 4B is a diagram illustrating an example of a result obtained by simulation of change in peak correlation value due to a delay and change in E-L correlation value due to the delay.

FIGS. 4A and 4B are each a diagram illustrating an example of a result obtained by simulation of a change in a peak correlation value due to a delay and a change in an E-L correlation value due to a delay, with specifications shown in "Development of 38 GHz-band Wireless Communication System Using High Altitude Platform Station (HAPS) for 5G Network—Study on full digital beamforming for HAPS with base station on-board", Ouchi et al., 2021 Institute of Electronics, Information and Communication Engineers Society Conference, B-3-11, September 2021".

FIG. 4A illustrates change in peak correlation value due to a delay under conditions with only a calibration signal without an orthogonal frequency division multiplexing (OFDM) signal. FIG. 4A has the horizontal axis representing the amount of delay per sample, and the peak correlation value is maximum at 0 without delay in the horizontal axis. As illustrated in FIG. 4A, even the amount of delay of less than one sample is calculated from the E-L correlation value by using symmetric correlation values that can be obtained with respect to positive and negative amounts of delay across 0 in the horizontal axis.

FIG. 4B illustrates change in E-L correlation value due to a delay under conditions where a calibration signal (denoted as a CAL signal) is superimposed on an OFDM signal (denoted as an NR signal). FIG. 4B illustrates the graph having the vertical axis representing the E-L correlation value, and the horizontal axis representing the amount of delay per sample. Under conditions without additive white Gaussian noise (AWGN), a clear linear function (function indicated by a solid line) passing through an origin is obtained. Under conditions of a signal to noise power ratio (SNR) of 18 dB by addition of the AWGN, the E-L correlation value is dispersed as indicated by an error bar, and then a clear linear function (function indicated by a dotted line) is obtained by plotting a value averaged 100 times. Transmission characteristics comparator 353 uses the property of the E-L correlation value for calculating even a delay difference of less than one sample among antenna elements to calculate (or determine) the amount of transmission characteristics correction (delay) of each of the antenna elements to allow all the antenna elements to be identical in characteristics (delay), and generating signal on amount of transmission characteristics corrections each indicating the amount of transmission characteristics correction to output the signal on amount of transmission characteristics corrections to corresponding transmission characteristics correctors 175-1 to 175-N.

Next, operation of communication apparatus 100 of FIG. 1 on a reception side will be described. Unless otherwise specified, a case where the preprocessing for performing calibration among antenna elements (i.e., correction by reception characteristics correctors 275-1 to 275-N) is performed will be described below.

Analog unit for reception characteristics calculation 185 performs transmission processing such as DA conversion and up-conversion on the calibration signal received from calibration signal generator 120, and generates high-frequency analog signals for respective antenna elements 145-1 to 145-N.

The high-frequency analog signals above are each an example of a first analog signal in the receiver and the reception method according to the present disclosure.

Adders 195-1 to 195-N add the high-frequency analog signals to the analog signals (main signals) received by corresponding N antenna elements 145-1 to 145-N, and output the added signals.

The analog signals received (via) by corresponding N antenna elements 145-1 to 145-N are each an example of a second analog signal in the receiver and the reception method according to the present disclosure.

The analog signals output from respective adders 195-1 to 195-N pass through corresponding duplexers 140-1 to 140-N to be received by corresponding power amplifiers 235-1 to 235-N.

The analog signals output from respective adders 195-1 to 195-N, the analog signals being obtained by adding the respective high-frequency analog signals to the analog signals received by corresponding N antenna elements 145-1 to 145-N, are each an example of a third analog signal in the receiver and the reception method according to the present disclosure.

Power amplifiers 235-1 to 235-N amplify power of the corresponding received analog signals and output the amplified analog signals to corresponding DCs 230-1 to 230-N.

DCs 230-1 to 230-N down-convert the analog signals received from corresponding power amplifiers 235-1 to 235-N from the reception frequency band, and output the down-converted analog signals to corresponding ADCs 225-1 to 225-N.

ADCs 225-1 to 225-N convert analog signals received from corresponding DCs 230-1 to 230-N into digital signals, and output the digital signals to transmission and reception characteristics calculator 190 and corresponding reception characteristics correctors 275-1 to 275-N.

The digital signals above are each an example of a first digital signal in the receiver and the reception method according to the present disclosure.

DCs 230-1 to 230-N, ADCs 225-1 to 225-N, and power amplifiers 235-1 to 235-N perform reception processing including at least AD conversion on analog signals obtained by adding high-frequency analog signals each corresponding to a calibration signal to analog signals received via corresponding N antenna elements 145-1 to 145-N to generate digital signals.

At least DCs 230-1 to 230-N, or in some cases including ADCs 225-5 to 225-N and power amplifiers 235-1 to 235-N, are each an example of a reception processing execution unit in the receiver and the reception method according to the present disclosure.

Transmission and reception characteristics calculator 190 calculates reception characteristics using the signals received from ADCs 225-1 to 225-N to generate signal on amount of reception characteristics corrections for the amount of reception characteristics correction, and outputs the signal on amount of reception characteristics corrections to corresponding reception characteristics correctors 275-1 to 275-N.

Reception characteristics correctors 275-1 to 275-N each cause a storage unit (not illustrated) to store the amount of reception characteristics correction (delay) indicated by corresponding one of the signal on amount of reception characteristics corrections received from the transmission and reception characteristics calculator 190. Alternatively, the amount of reception characteristics correction (delay) may be stored in a storage unit (not illustrated) by transmission and reception characteristics calculator 190. When the preprocessing for performing the calibration among antenna elements has already been performed in this way, thereafter, reception characteristics correctors 275-1 to 275-N perform the calibration among antenna elements by correcting the characteristics of the digital signals received from corresponding ADCs 225-1 to 225-N based on the amounts of correction of reception characteristics (delay) indicated by the corresponding signal on amount of reception characteristics corrections, and output the calibrated digital signals to reception digital precoding unit 215.

When the preprocessing for performing the calibration among antenna elements has already been performed, details of the preprocessing are not described. In this case, reception characteristics correctors 275-1 to 275-N receive the analog signals received by corresponding N antenna elements 145-1 to 145-N via corresponding duplexers 140-1 to 140-N, power amplifiers 235-1 to 235-N, DCs 230-1 to 230-N, and ADCs 225-1 to 225-N, described above. As described above, reception characteristics correctors 275-1 to 275-N perform the calibration among antenna elements, and output the calibrated digital signals to reception digital precoding unit 215.

The analog signal received by each of N antenna elements 145-1 to 145-N is an example of the second analog signal in the receiver and the reception method according to the present disclosure. At least DCs 230-1 to 230-N, or in some cases including ADCs 225-1 to 225-N and power amplifiers 135-1 to 135-N, are each an example of the second reception processing execution unit in the transmitter and the transmission method according to the present disclosure.

Reception digital precoding unit 215 performs digital precoding on the digital signals subjected to the reception characteristics correction received from the reception characteristics correctors 275-1 to 275-N to generate L outputs (reception streams 1 to L), and outputs the L outputs to corresponding reception signal reproducers 210-1 to 210-L.

As described above, after a reception calibration signal passes through a transmission circuit (analog unit for reception characteristics calculation 185) dedicated to the calibration signal, delay measurement by correlation is performed. That is, the delay measurement by correlation is performed with the reception calibration signal that does not pass through a delay element in the transmission circuit for the main signal, unlike PTL 2.

Figure 5:
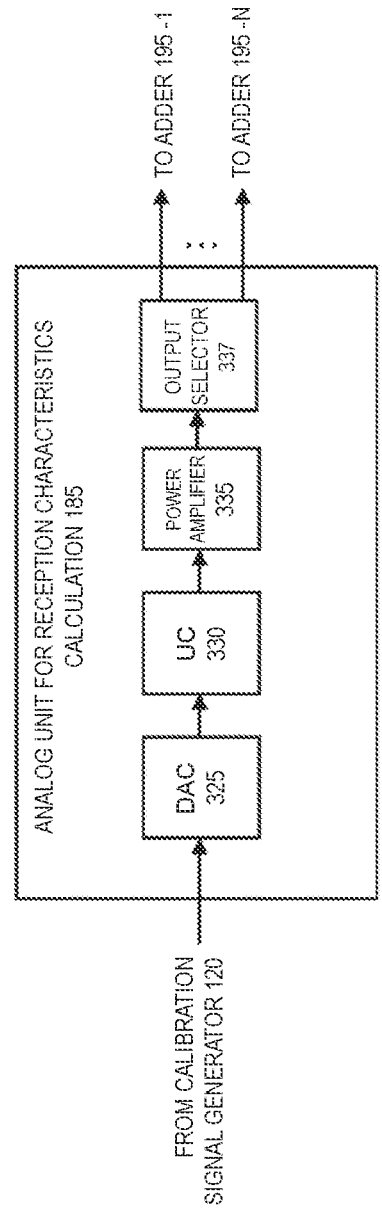
FIG. 5 is a diagram illustrating an example of a configuration of a analog unit for reception characteristics calculation according to the first exemplary embodiment of the present disclosure.

FIG. 5 is a diagram illustrating an example of a configuration of the analog unit for reception characteristics calculation 185. Analog unit for reception characteristics calculation 185 includes DAC 325, UC 330, power amplifier 335, and output selector 337.

DAC 325 converts the calibration signal, which is a digital signal received from calibration signal generator 120, into an analog signal and outputs the analog signal to UC 330.

As with UCs 130-1 to 130-N, UC 330 up-converts an analog signal into a transmission frequency band and outputs the signal to power amplifier 335.

As with power amplifiers 135-1 to 135-N, power amplifier 335 amplifies power of the up-converted analog signal received from UC 330 and outputs the amplified analog signal to output selector 337.

Output selector 337 sequentially selects one of adders 195-1 to 195-N to output the analog signal received from power amplifier 335 to the selected adder, and outputs 0 (null) to the other adders that are not selected.

DAC 325, UC 330, power amplifier 335, and output selector 337 perform transmission processing including at least DA conversion on the calibration signal to generate an analog signal.

The analog signal above is an example of the first analog signal in the receiver and the reception method according to the present disclosure. At least DAC 325, or in some cases including UC 330, power amplifier 335, and output selector 337, i.e., analog unit for reception characteristics calculation 185, is an example of a transmission processing execution unit or a first transmission processing execution unit in the receiver and the reception method according to the present disclosure.

Transmission and reception characteristics calculator 190 illustrated in FIG. 3 includes input selector 441 that selects an ADC, to which the calibration signal is output from analog unit for reception characteristics calculation 185, among ADCs 225-1 to 225-N, and outputs input from the ADC to correlation calculator 443.

Correlation calculator 443 performs a correlation calculation between a digital signal received from input selector 441, corresponding to one of analog signals received by antenna elements 145-1 to 145-N, and the pseudorandom sequence generated by calibration signal generator 120 and received from calibration signal generator 120.

E-L detector 447 detects a peak value in one period in the pseudorandom sequence and performs correlation calculation for multiple periods as necessary, thereby obtaining a desired correlation gain. E-L detector 447 also outputs an E-L correlation value, which is a result obtained by subtracting a correlation value after one sample from the peak value from a correlation value before one period from the peak value, to reception characteristics comparator 453 as reception characteristics.

The output from analog unit for reception characteristics calculation 185 is sequentially switched to each of N antenna elements 145-1 to 145-N, so that reception characteristics comparator 453 compares characteristics of each of N antenna elements 145-1 to 145-N. Then, reception characteristics comparator 453 uses the property of the E-L correlation value illustrated in FIG. 4B for calculating (or determining) the amount of reception characteristics correction (delay) of each of N antenna elements 145-1 to 145-N to allow all the antenna elements to be identical in characteristics (delay), and generating signal on amount of reception characteristics corrections each indicating the amount of reception characteristics correction to output the signal on amount of reception characteristics corrections to corresponding reception characteristics correctors 275-1 to 275 N.

Transmission and reception characteristics calculator 190 is an example of a reception characteristics calculator in the receiver and the reception method according to the present disclosure.

Effects of First Exemplary Embodiment

The configuration above according to the first exemplary embodiment enables providing the transmitter and the receiver that maintain constant beamforming performance by delay calibration using the property of the E-L correlation value. In particular, after the transmission calibration signal and the reception calibration signal pass through the reception circuit and the transmission circuit dedicated to the calibration signal, respectively, delay measurement by correlation is performed. That is, the transmission calibration signal and the reception calibration signal do not pass through the delay elements in the reception circuit and the transmission circuit of the main signal, respectively, and the delay measurement is performed by correlation, unlike PTL 2. Thus, the delay calibration of transmission and the delay calibration of reception can be performed independently of each other, so that time required for the delay calibration among the antenna elements can be shortened to half as compared with PTL 2.

Second Exemplary Embodiment

Figure 6:
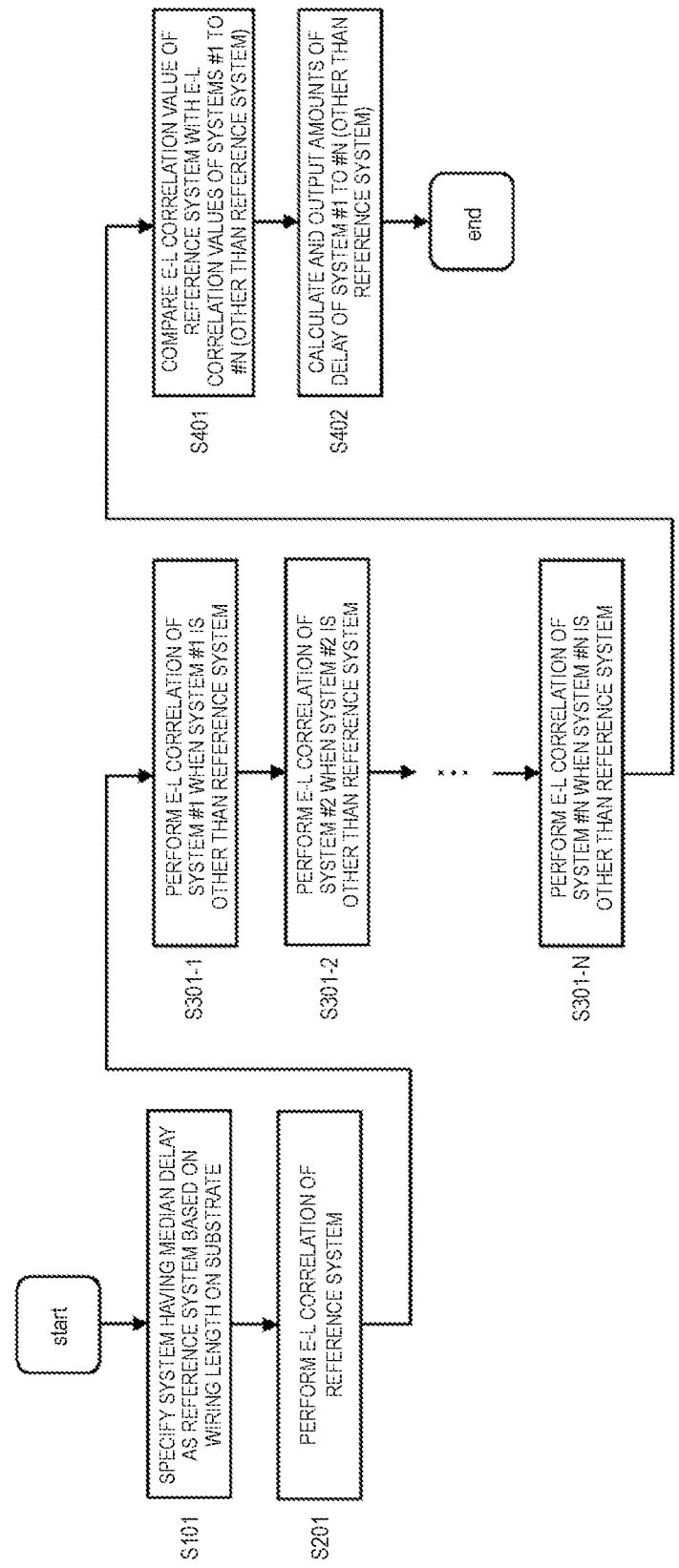
FIG. 6 is a diagram illustrating an example of a flowchart of delay calibration among antenna elements (systems) in transmission or reception according to a second exemplary embodiment of the present disclosure.

FIG. 6 is a diagram illustrating an example of a flowchart of delay calibration among antenna elements, which may be referred to also as systems, in transmission or reception of communication apparatus 100 illustrated in FIG. 1. Communication apparatus 100 can perform delay calibration of transmission and delay calibration of reception independently of each other based on this flowchart.

When a high frequency band is particularly used, a difference in wiring length on a substrate increases in ratio in a main factor of a delay difference between antenna elements, instead of an individual difference in delay characteristics among analog elements. Communication apparatus 100 (e.g., a controller, correlation calculators 343, 443, E-L detector s 347, 447, transmission characteristics comparator 353, and a reception characteristics comparator 453, which are not illustrated in FIG. 1) uses this property in S101 to specify a system having a median delay as a reference system (reference antenna element) based on the wiring length on the substrate. Alternatively, the reference system may be manually specified from substrate information (the wiring length on the substrate) by a person such as a designer, for example. Here, the median delay means a median among delays of respective N antenna elements 145-1 to 145-N. As described above, when the system having the median delay is used as the reference system, a range of the amount of delay correction can be reduced as compared with PTL 2. The reference system is not limited to a system having a median delay, and a system having a delay value near the median delay may be used.

When communication apparatus 100 specifies the reference system, the wiring length on the substrate may be stored in a design information database provided in a storage unit (not illustrated), for example. The wiring length on the substrate is an example of design information according to the present disclosure.

In S201, correlation calculator 343 and E-L detector 347 work together for delay calibration of transmission, or correlation calculator 443 and E-L detector 447 work together for delay calibration of reception, to perform the E-L correlation of the reference system.

In each of S301-1 to S301-N, correlation calculator 343 and E-L detector 347 work together for delay calibration of transmission, or correlation calculator 443 and E-L detector 447 work together for delay calibration of reception, to perform the E-L correlation of corresponding one of systems #1 to #N when systems #1 to #N are other than the reference system.

In S401, transmission characteristics comparator 353 (for delay calibration of transmission) or reception characteristics comparator 453 (for delay calibration of reception), compares the E-L correlation value of the reference system with the E-L correlation values of systems #1 to #N (other than the reference system).

In S402, transmission characteristics comparator 353 (for delay calibration of transmission) or reception characteristics comparator 453 (for delay calibration of reception) calculates and outputs the amount of delay of each of systems #1 to #N (other than the reference system) to allow the other systems to be identical in delay characteristics to the reference system based on the comparison result in S401 and the property of the E-L correlation value illustrated in FIG. 4B, and more specifically, calculates and outputs the amount of delay as the signal on amount of transmission characteristics correction or the signal on amount of reception characteristics correction. Then, the flow illustrated in FIG. 6 ends.

Effects of Second Exemplary Embodiment

The above configuration according to a second exemplary embodiment has an effect of enabling the range of the amount of delay correction to be reduced by specifying the system having the median delay as the reference system to allow the other systems to be identical in delay characteristics to the reference system. As with the first exemplary embodiment, delay calibration of transmission and delay calibration of reception can be performed independently of each other, and there is also an effect of enabling the time required for delay calibration among antenna elements to be reduced to half as compared with PTL 2.

Third Exemplary Embodiment

Figure 7:
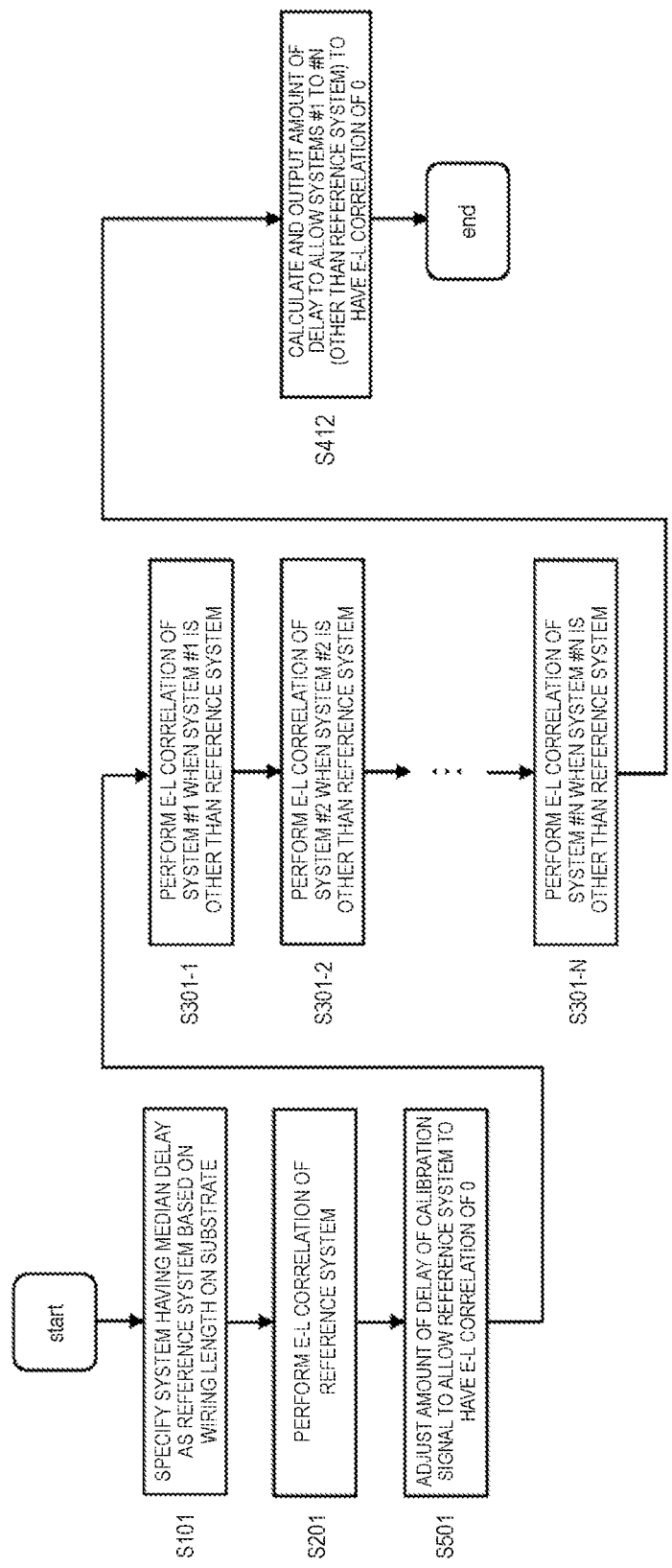
FIG. 7 is a diagram illustrating another example of a flowchart of delay calibration among antenna elements (systems) in transmission or reception according to a third exemplary embodiment of the present disclosure.

FIG. 7 is a diagram illustrating another example of a flowchart of delay calibration among antenna elements (systems) in transmission or reception of communication apparatus 100 illustrated in FIG. 1. Communication apparatus 100 can perform delay calibration of transmission and delay calibration of reception independently of each other based on this flowchart. The same processing as that in the flowchart of the second exemplary embodiment is denoted by the same reference numeral, and is not described below.

S101 and S201 are the same as those in the second exemplary embodiment.

In S501, calibration signal generator 120 adjusts the amount of delay of the calibration signal to allow the reference system to have an E-L correlation of 0.

S301-1 to S301-N are the same as those in the second exemplary embodiment.

The third exemplary embodiment does not require the processing in S401 in the second exemplary embodiment, and in S412, transmission characteristics comparator 353 (for delay calibration of transmission) or reception characteristics comparator 453 (for delay calibration of reception) calculates and outputs the amount of delay to allow systems #1 to #N (other than the reference system) to have an E-L correlation of 0, and more specifically, calculates and outputs the amount of delay as the signal on amount of transmission characteristics correction or as the signal on amount of reception characteristics correction. Then, the flow illustrated in FIG. 7 ends.

Effects of Third Exemplary Embodiment

The above configuration according to the third exemplary embodiment has an effect of enabling the range of the amount of delay correction to be reduced by specifying the system having the median delay as the reference system to allow the other systems to be identical in delay characteristics to the reference system. Unlike the second exemplary embodiment, the amount of delay of the calibration signal is adjusted to allow the reference system to have an E-L correlation of 0, so that the amount of delay can be calculated to allow systems #1 to #N (other than the reference system) to also have an E-L correlation of 0. Thus, the processing can be simplified, and the effect of enabling the range of the amount of delay correction to be reduced can be further enhanced because the amount of delay is adjusted to an E-L correlation of 0 (i.e., a median value). As with the first and second exemplary embodiments, delay calibration of transmission and delay calibration of reception can be performed independently of each other, and there is also an effect of enabling the time required for delay calibration among antenna elements to be reduced to half as compared with PTL 2.

Fourth Exemplary Embodiment

Figure 8:
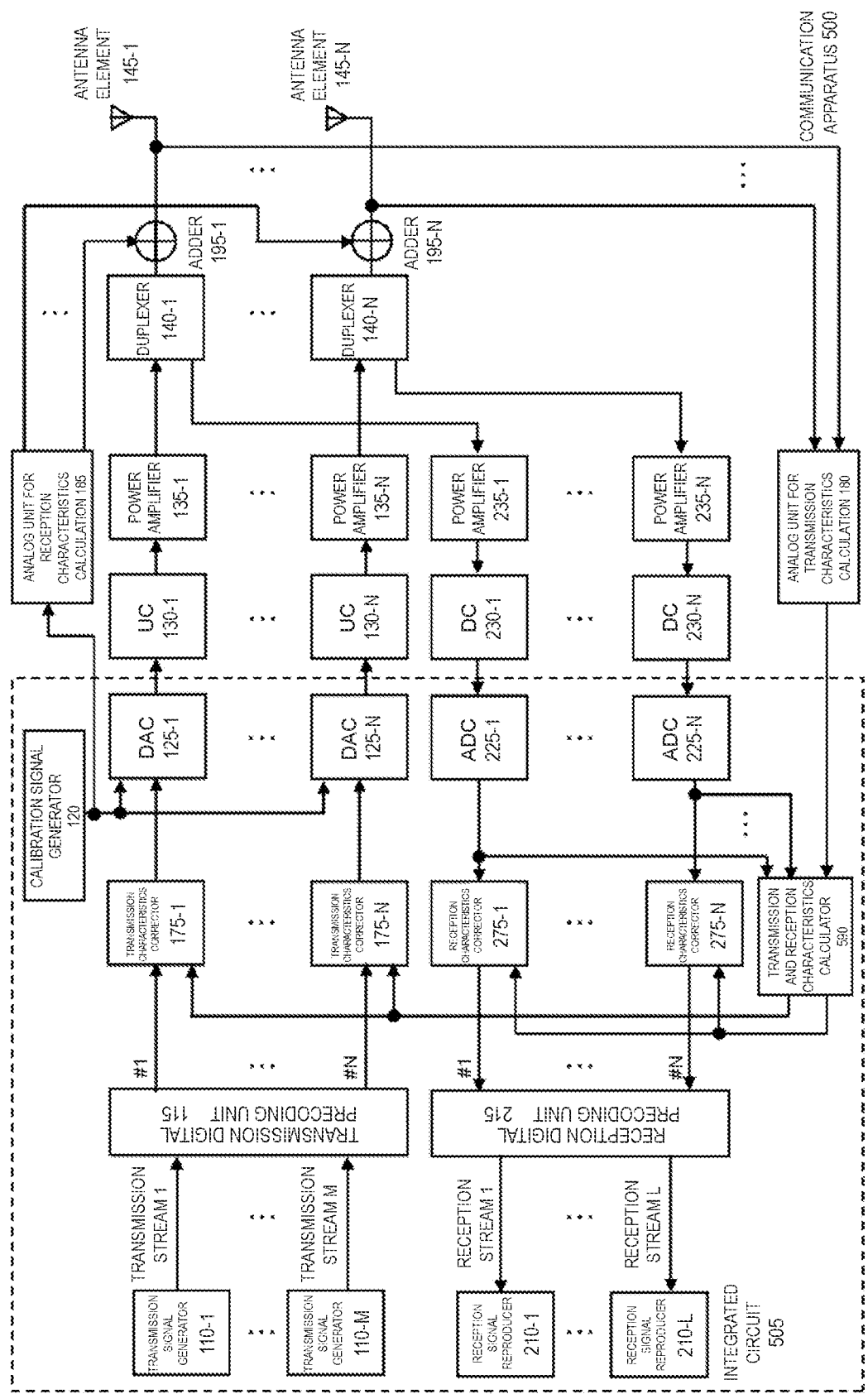
FIG. 8 is a diagram illustrating an example of a configuration of a communication apparatus according to a fourth exemplary embodiment of the present disclosure.

FIG. 8 is a diagram illustrating an example of a configuration of communication apparatus 500 according to a fourth exemplary embodiment of the present disclosure. The same components as those of communication apparatus 100 according to the first exemplary embodiment are denoted by the same reference numerals, and are not described below.

Communication apparatus 500 illustrated in FIG. 8 has a configuration in which transmission and reception characteristics calculator 590 is replaced with transmission and reception characteristics calculator 190, as compared with communication apparatus 100 in the first exemplary embodiment illustrated in FIG. 1. Communication apparatus 500 may include components that perform digital processing as integrated circuit 505. Examples of the components that perform the digital processing include transmission signal generators 110-1 to 110-M, transmission digital precoding unit 115, calibration signal generator 120, DACs 125-1 to 125-N, reception signal reproducer 210-1 to 210-L, reception digital precoding unit 215, ADCs 225-1 to 225-N, transmission characteristics correctors 175-1 to 175-N, transmission and reception characteristics calculator 590, and reception characteristics correctors 275-1 to 275-N. Integrated circuit 505 may include not only components that perform the digital processing but also some or all of components that perform analog processing.

Figure 9:
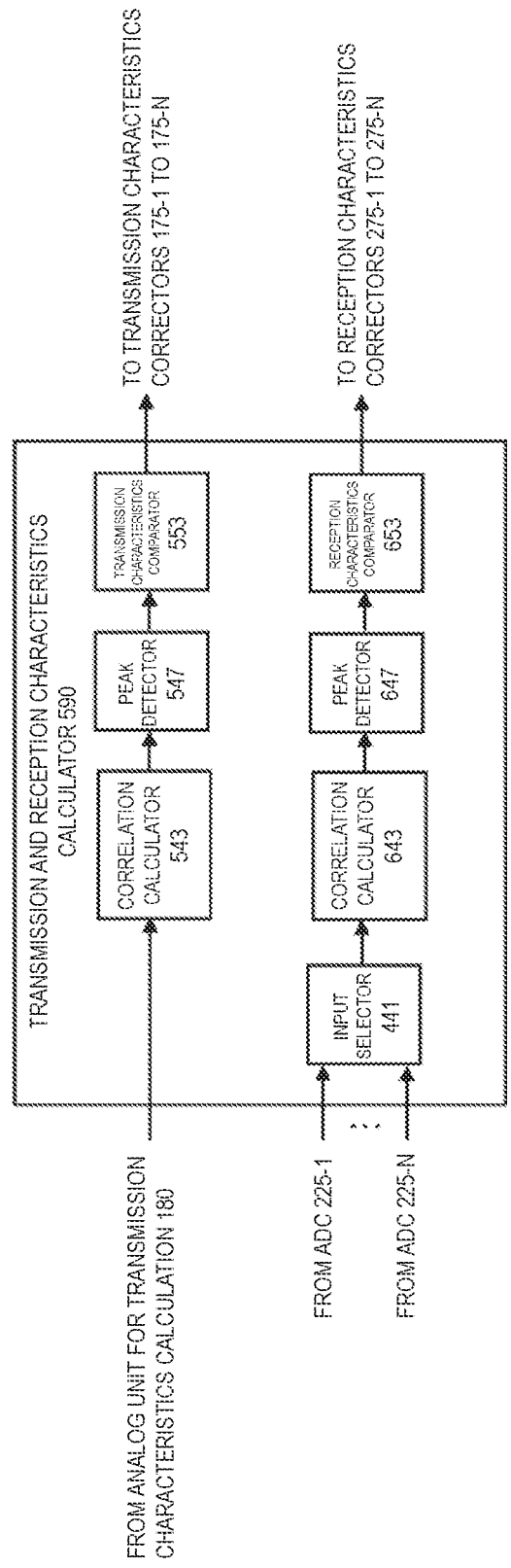
FIG. 9 is a diagram illustrating an example of a configuration of a transmission and reception characteristics calculator according to the fourth exemplary embodiment of the present disclosure.

FIG. 9 is a diagram illustrating an example of a configuration of transmission and reception characteristics calculator 590. As compared with transmission and reception characteristics calculator 190 in the first embodiment illustrated in FIG. 3, transmission and reception characteristics calculator 590 illustrated in FIG. 9 has a configuration in which correlation calculators 343 and 443, E-L detectors 347 and 447, transmission characteristics comparator 353, and reception characteristics comparator 453 are replaced with correlation calculators 543 and 643, peak detectors 547 and 647, transmission characteristics comparator 553, and reception characteristics comparator 653, respectively.

Correlation calculators 543 and 643 perform correlation calculation between digital input signals corresponding to the antenna elements 145-1 to 145-N and a calibration signal (pseudorandom sequence) generated by calibration signal generator 120 and received from calibration signal generator 120 at a high-speed sampling rate (e.g., 10 times a transmission sampling rate, or the like).

Peak detectors 547 and 647 each detect a peak value of the pseudorandom sequence within one period and perform correlation calculation for multiple periods as necessary to obtain a desired correlation gain. Peak detectors 547 and 647 each also detect peak timing, and output the detected peak timing to transmission characteristics comparator 553 and reception characteristics comparator 653 as transmission (delay) and reception (delay) characteristics, respectively.

Transmission characteristics comparator 553 compares characteristics (delay) of each of N antenna elements 145-1 to 145-N. Then, transmission characteristics comparator 553 calculates (or determines) the amount of transmission characteristics correction of each of N antenna elements 145-1 to 145-N to allow all the antenna elements to be identical in characteristics, and generates signal on amount of transmission characteristics corrections each indicating the amount of transmission characteristics correction to output the signal on amount of transmission characteristics corrections to corresponding transmission characteristics correctors 175-1 to 175-N.

Similarly, reception characteristics comparator 653 compares the characteristics (delay) of each of N antenna elements 145-1 to 145-N. Then, reception characteristics comparator 653 calculates (or determines) the amount of reception characteristics correction of each of N antenna elements 145-1 to 145-N to allow all the antenna elements to be identical in characteristics, and generates signal on amount of reception characteristics corrections each indicating the amount of reception characteristics correction to output the signal on amount of reception characteristics corrections to corresponding reception characteristics correctors 275-1 to 275-N.

Effects of Fourth Exemplary Embodiment

The above configuration according to the fourth exemplary embodiment enables providing the transmitter and the receiver that maintain constant beamforming performance by delay calibration using correlation calculation at a high-speed sampling rate. In particular, after the transmission calibration signal and the reception calibration signal pass through the reception circuit and the transmission circuit dedicated to the calibration signal, respectively, delay measurement by correlation is performed. That is, the transmission calibration signal and the reception calibration signal do not pass through the delay elements in the reception circuit and the transmission circuit of the main signal, respectively, and the delay measurement is performed by correlation, unlike PTL 2. Thus, the delay calibration of transmission and the delay calibration of reception can be performed independently of each other, so that time required for the delay calibration among the antenna elements can be shortened to half as compared with PTL 2.

Fifth Exemplary Embodiment

Figure 10:
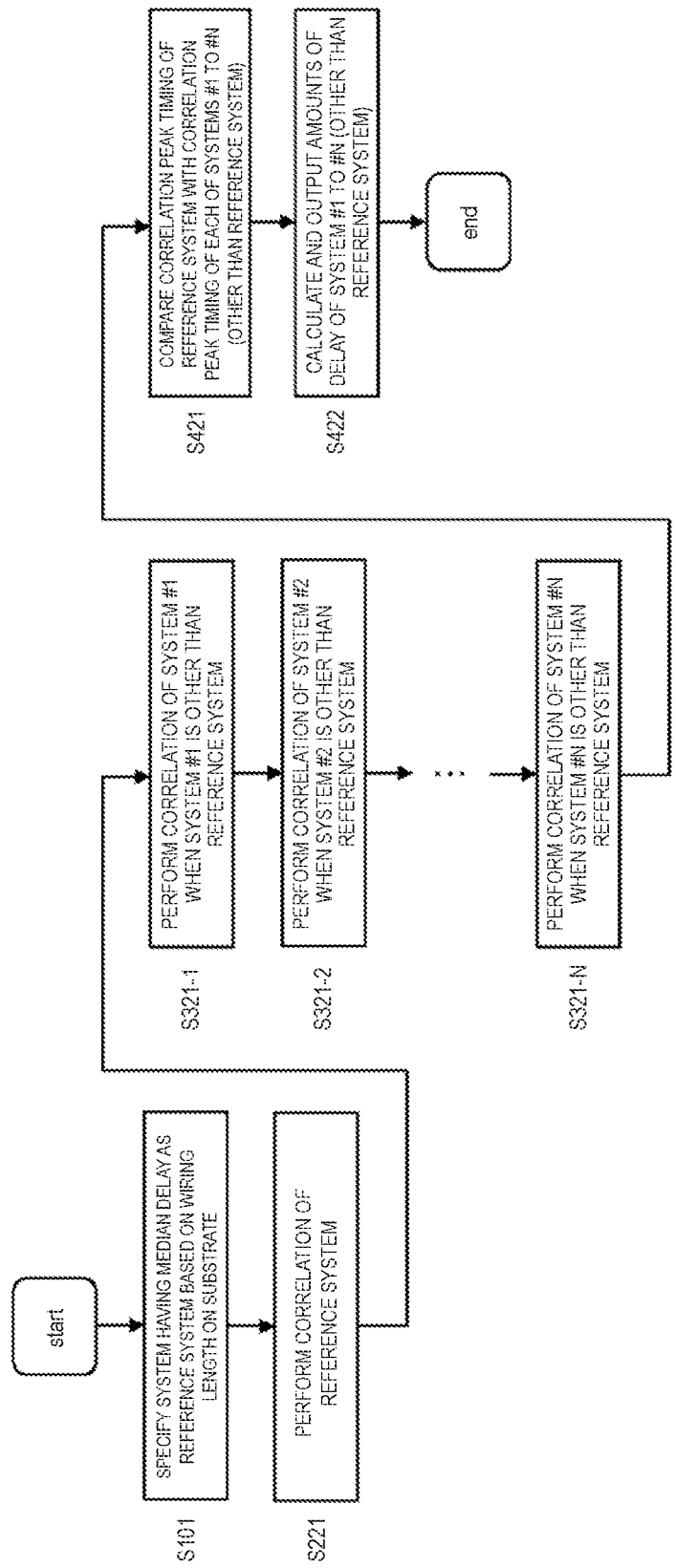
FIG. 10 is a diagram illustrating an example of a flowchart of delay calibration among antenna elements (systems) in transmission or reception according to a fifth exemplary embodiment of the present disclosure.

FIG. 10 is a diagram illustrating an example of a flowchart of delay calibration among antenna elements (systems) in transmission or reception of communication apparatus 500 illustrated in FIG. 8. Communication apparatus 500 can perform delay calibration of transmission and delay calibration of reception independently of each other based on this flowchart. The same processing as that in the flowchart of each of the second and third exemplary embodiments is denoted by the same reference numeral, and is not described below.

S101 is the same as that in each of the second and third exemplary embodiments.

In S221, correlation calculator 543 and peak detector 547 work together for delay calibration of transmission, or correlation calculator 643 and peak detector 647 cooperate for delay calibration of reception, to perform correlation of the reference system.

In each of S321-1 to S321-N, correlation calculator 543 and peak detector 547 work together for delay calibration of transmission, or correlation calculator 643 and peak detector 647 work together for delay calibration of reception, to perform correlation of corresponding one of systems #1 to #N when systems #1 to #N are other than the reference system.

In S421, transmission characteristics comparator 553 (or delay calibration of transmission) or reception characteristics comparator 653 (for delay calibration of reception) compares correlation peak timing of the reference system with correlation peak timing of each of systems #1 to #N (other than the reference system).

In S422, transmission characteristics comparator 553 (for delay calibration of transmission) or the reception characteristics comparator 653 (for delay calibration of reception) calculates and outputs the amount of delay of each of systems #1 to #N (other than the reference system) to allow the other systems to be identical in delay characteristics to the reference system based on the comparison result in S421, and more specifically, calculates and outputs the amount of delay as a signal on amount of transmission characteristics correction or as a signal on amount of reception characteristics correction. Then, the flow illustrated in FIG. 10 ends.

Effects of Fifth Exemplary Embodiment

The above configuration according to the fifth exemplary embodiment has an effect of enabling the range of the amount of delay correction to be reduced by specifying the system having the median delay as the reference system to allow the other systems to be identical in delay characteristics to the reference system. Unlike the second and third exemplary embodiments, the E-L correlation is not required by performing the correlation calculation at the high-speed sampling rate. As with the first to fourth exemplary embodiments, delay calibration of transmission and delay calibration of reception can be performed independently of each other, and there is also an effect of enabling the time required for delay calibration among antenna elements to be reduced to half as compared with PTL 2.

Sixth Exemplary Embodiment

Figure 11:
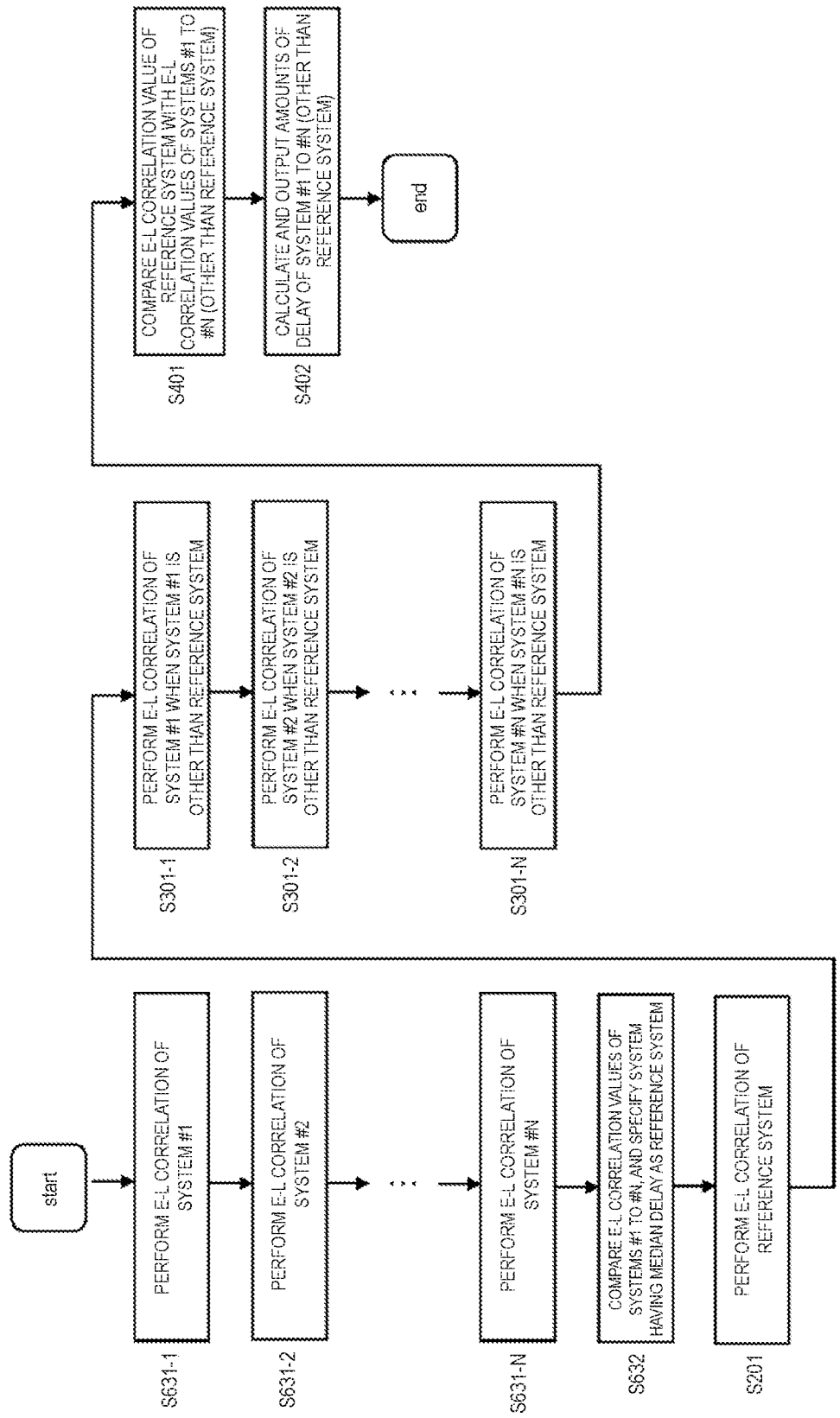
FIG. 11 is a diagram illustrating another example of a flowchart of delay calibration among antenna elements (systems) in transmission or reception according to a sixth exemplary embodiment of the present disclosure.

FIG. 11 is a diagram illustrating another example of a flowchart of delay calibration among antenna elements (systems) in transmission or reception of communication apparatus 100 illustrated in FIG. 1. Communication apparatus 100 can perform delay calibration of transmission and delay calibration of reception independently of each other based on this flowchart. The same processing as that in the flowchart of each of the second and third exemplary embodiments is denoted by the same reference numeral, and is not described below.

In each of S631-1 to S631-N, correlation calculator 343 and E-L detector 347 work together for delay calibration of transmission, or correlation calculator 443 and E-L detector 447 work together for delay calibration of reception, to perform the E-L correlation of corresponding one of systems #1 to #N.

In S632, transmission characteristics comparator 353 (for delay calibration of transmission) or reception characteristics comparator 453 (for delay calibration of reception) compares E-L correlation values of systems #1 to #N to specify a system having a median delay as a reference system.

S201, S301-1 to S301-N, S401, and S402 are the same as those in the second exemplary embodiment.

Effects of Sixth Exemplary Embodiment

The above configuration according to the sixth exemplary embodiment has an effect of enabling the range of the amount of delay correction to be reduced by specifying the system having the median delay as the reference system to allow the other systems to be identical in delay characteristics to the reference system. Unlike the second exemplary embodiment, the sixth exemplary embodiment enables the reference system to be automatically specified by performing the E-L correlation of systems #1 to #N and comparing these correlation values, instead of specifying the reference system based on wiring length on a substrate. As with the first to fifth exemplary embodiments, delay calibration of transmission and delay calibration of reception can be performed independently of each other, and there is also an effect of enabling the time required for delay calibration among antenna elements to be reduced to half as compared with PTL 2.

Seventh Exemplary Embodiment

Figure 12:
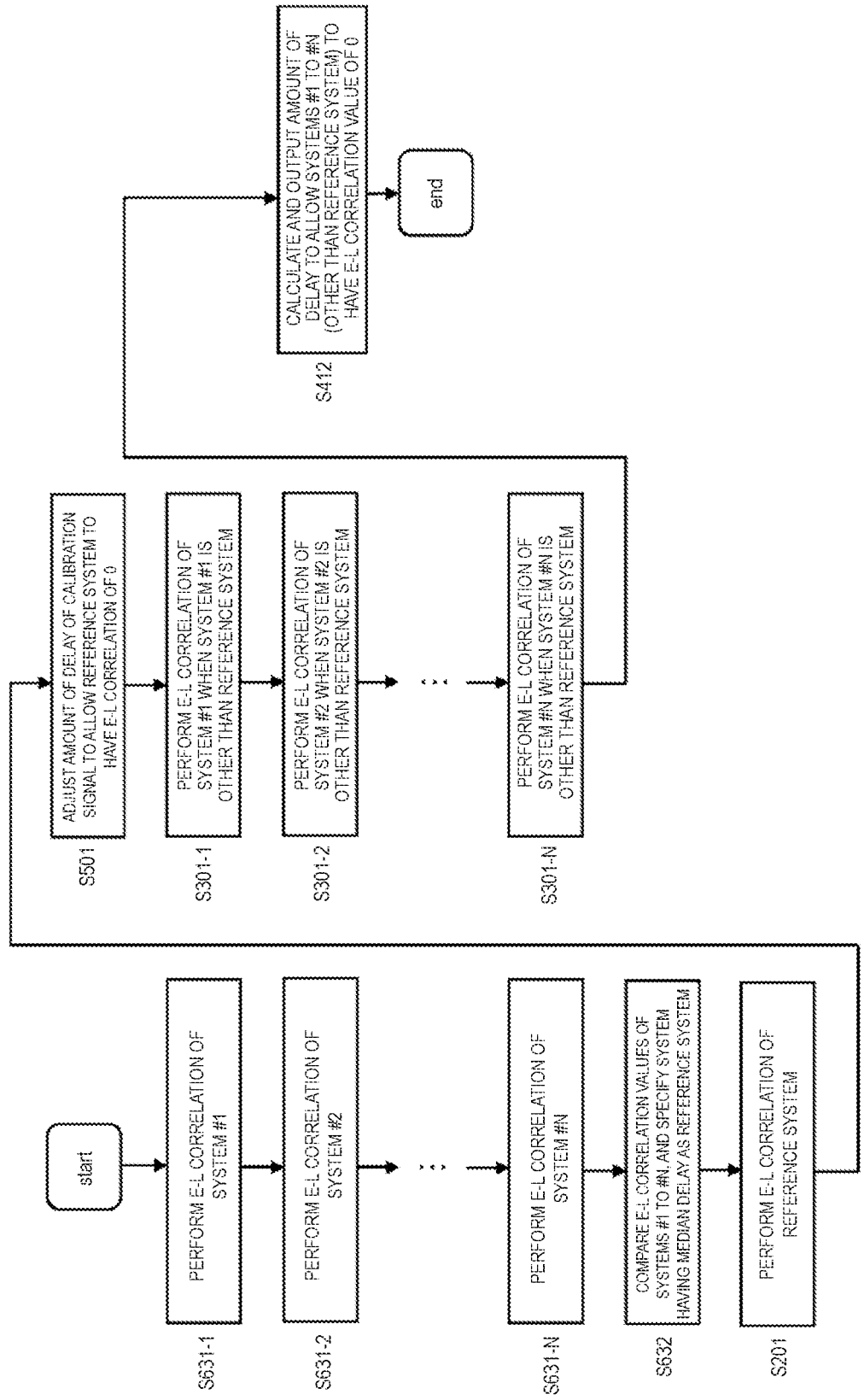
FIG. 12 is a diagram illustrating yet another example of a flowchart of delay calibration among antenna elements (systems) in transmission or reception according to a seventh exemplary embodiment of the present disclosure.

FIG. 12 is a diagram illustrating another example of a flowchart of delay calibration among antenna elements (systems) in transmission or reception of communication apparatus 100 illustrated in FIG. 1. Communication apparatus 100 can perform delay calibration of transmission and delay calibration of reception independently of each other based on this flowchart. The same processing as that in the flowchart of each of the second, third, and sixth exemplary embodiments is denoted by the same reference numeral, and is not described below.

As illustrated in FIGS. 12, S631-1 to S631-N, S632, and S201 are the same as those in the sixth exemplary embodiment, and S501, S301-1 to S301-N, and S412 are the same as those in the third exemplary embodiment. Unlike the flowchart illustrated in FIG. 7 in the third exemplary embodiment, the seventh exemplary embodiment causes the E-L correlation of systems #1 to #N to be performed to compare these correlation values as in the sixth exemplary embodiment so that the reference system is automatically specified.

Effects of Seventh Exemplary Embodiment

The above configuration according to the seventh exemplary embodiment has an effect of enabling the range of the amount of delay correction to be reduced by specifying the system having the median delay as the reference system to allow the other systems to be identical in delay characteristics to the reference system. Unlike the third exemplary embodiment, the seventh exemplary embodiment enables the reference system to be automatically specified by performing the E-L correlation of systems #1 to #N and comparing these correlation values, instead of specifying the reference system based on wiring length on a substrate. Unlike the sixth exemplary embodiment, the amount of delay of the calibration signal is adjusted to allow the reference system to have an E-L correlation of 0, so that the amount of delay can be calculated to allow systems #1 to #N (other than the reference system) to also have an E-L correlation of 0. Thus, the processing can be simplified, and the effect of enabling the range of the amount of delay correction to be reduced can be further enhanced because the amount of delay is adjusted to an E-L correlation of 0 (i.e., a median value). As with the first to sixth exemplary embodiments, delay calibration of transmission and delay calibration of reception can be performed independently of each other, and there is also an effect of enabling the time required for delay calibration among antenna elements to be reduced to half as compared with PTL 2.

Eighth Exemplary Embodiment

FIG. 13 is a diagram illustrating another example of a flowchart of delay calibration among antenna elements (systems) in transmission or reception of communication apparatus 500 illustrated in FIG. 8. Communication apparatus 500 can perform delay calibration of transmission and delay calibration of reception independently of each other based on this flowchart. The same processing as that in the flowchart of each of the second, third, and fifth to seventh exemplary embodiments is denoted by the same reference numeral, and is not described below.

In each of S641-1 to S641-N, correlation calculator 543 and peak detector 547 work together for delay calibration of transmission, or correlation calculator 643 and peak detector 647 work together for delay calibration of reception, to perform correlation of corresponding one of systems #1 to #N.

In S642, transmission characteristics comparator 553 (for delay calibration of transmission) or reception characteristics comparator 653 (for delay calibration of reception) compares correlation peak timing of each of systems #1 to #N to specify a system having a median delay as a reference system.

S221, S321-1 to S321-N, S421, and S422 are the same as those in the fifth exemplary embodiment.

Effects of Eighth Exemplary Embodiment

The above configuration according to the eighth exemplary embodiment has an effect of enabling the range of the amount of delay correction to be reduced by specifying the system having the median delay as the reference system to allow the other systems to be identical in delay characteristics to the reference system. Unlike the fifth exemplary embodiment, the eighth exemplary embodiment enables the reference system to be automatically specified by performing correlation of systems #1 to #N and comparing correlation peak timing of each system, instead of specifying the reference system based on wiring length on a substrate. Unlike the sixth and seventh exemplary embodiments, the E-L correlation is not required by performing correlation calculation at a high-speed sampling rate. As with the first to seventh exemplary embodiments, delay calibration of transmission and delay calibration of reception can be performed independently of each other, and there is also an effect of enabling the time required for delay calibration among antenna elements to be reduced to half as compared with PTL 2.

(Supplement) Although the exemplary embodiments have been described above with reference to the drawings, the present disclosure is not limited to the contents described in the first to eighth exemplary embodiments, and can be implemented in any form for achieving the object of the present disclosure and an object related to or associated with the object. Thus, the present disclosure may be as follows, for example.

(1) Although the first to eighth exemplary embodiments are each configured with full digital beamforming, the present disclosure is not limited thereto, and may be configured with hybrid beamforming. Even this configuration enables acquiring a similar effect as in the exemplary embodiments above.

(2) In first to eighth exemplary embodiments, the delay calibration may be performed only once or repeatedly. Although the flowchart is to be repeated in the latter case, particularly in the second, third, and fifth to eighth exemplary embodiments, the reference system having a median delay may be specified only once at the beginning. Especially in the second, third, sixth, and seventh exemplary embodiments, the reference system is specified based on wiring length on a substrate, so that the reference system is desirably specified only once at the beginning.

(3) In the first to third, sixth, and seventh exemplary embodiments, the E-L detector may be improved in accuracy by averaging. As the averaging, infinite impulse response (IIR) may be used in addition to simple averaging, for example.

(4) In the fourth, fifth, and eighth exemplary embodiments, the peak detector may be improved in accuracy by averaging. As the averaging, peak detection may be performed using the IIR in addition to the simple averaging of several samples before and after a peak, for example.

(5) In the first, second, and sixth exemplary embodiments, the transmission characteristics comparator and the reception characteristics comparator may calculate delay differences between the reference system and the other systems using the property of the change of the E-L correlation value illustrated in FIG. 4B, and the property of the change described above may be held in a table and used, for example.

(6) In the first, third, and seventh exemplary embodiments, the transmission characteristics comparator and the reception characteristics comparator may calculate the amount of delay to allow each system to have an E-L correlation value of 0, using the property of the change in the E-L correlation value illustrated in FIG. 4B, and the property of the change described above may be held in a table and used, for example.
(7) Some of the first to eighth exemplary embodiments may be combined with each other.
(8) In the first to eighth exemplary embodiments, the notation "unit" used for each component may be replaced with another notation such as "circuit (circuitry)", "assembly", "device", or "module".
(9) The present disclosure may relate to implementation using hardware and software. The above exemplary embodiments may be implemented or executed by using a computing device (processor). The computing device or processor may be, for example, a main processor/general purpose processor, a digital signal processor (DSP), an application specific integrated circuit (ASIC), a field programmable gate array (FPGA), other programmable logic device, or the like. The above exemplary embodiments may be implemented or achieved by combining these devices.
(10) The first to eighth exemplary embodiments may be achieved by a software module mechanism executed by a processor or directly by hardware. Additionally, a software module and hardware implementation also can be combined. The software module may be stored on various types of computer-readable storage media, such as a random access memory (RAM), an erasable programmable read-only memory (EPROM), an electrically erasable programmable read-only memory (EEPROM), a flash memory, a register, a hard disk, a CD-ROM, a DVD, and the like.

Summary of Exemplary Embodiments

A transmitter according to an exemplary embodiment of the present disclosure includes: a plurality of antenna elements; a calibration signal generator which, in operation, generates a digital calibration signal; a transmission processing execution unit which, in operation, performs transmission processing including digital-to-analog conversion on second digital signals to generate first analog signals, the second digital signals being obtained by adding the digital calibration signal to each of a plurality of first digital signals, the first digital signals each corresponding to respective one of the antenna elements; a reception processing execution unit which, in operation, performs reception processing including analog-to-digital conversion on the first analog signals to generate third digital signals each corresponding to respective one of the antenna elements, the first analog signals each passing through respective one of the antenna elements; a transmission characteristics calculator which, in operation, performs correlation calculation between the digital calibration signal and each of the third digital signals to calculate transmission delay characteristics each corresponding to respective one of the antenna elements and which, in operation, calculates transmission delay correction amounts based on the transmission delay characteristics, each of the transmission delay correction amounts corresponding to respective one of the antenna elements; and a transmission characteristics corrector which, in operation, corrects the transmission delay characteristics based on the transmission delay correction amounts.

A receiver according to an exemplary embodiment of the present disclosure includes: a plurality of antenna elements; a calibration signal generator which, in operation, generates a digital calibration signal; a transmission processing execution unit which, in operation, performs transmission processing including digital-to-analog conversion on the digital calibration signal to generate a first analog signal; a reception processing execution unit which, in operation, performs reception processing including analog-to-digital conversion on third analog signals to generate first digital signals each corresponding to respective one of the antenna elements, the third analog signals being obtained by adding the first analog signal to each of a plurality of second analog signals, the second analog signals each received via corresponding one of the antenna elements; a reception characteristics calculator which, in operation, performs correlation calculation between the digital calibration signal and each of the first digital signals to calculate reception delay characteristics each corresponding to respective one of the antenna elements and which, in operation, calculates reception delay correction amounts based on the reception delay characteristics, each of the reception delay correction amounts corresponding to respective one of the antenna elements; and a reception characteristics corrector which, in operation, corrects the reception delay characteristics based on the reception delay correction amounts.

A transmission method according to an exemplary embodiment of the present disclosure is performed by a transmitter including a plurality of antenna elements. The transmission method includes: generating a digital calibration signal; performing transmission processing including digital-to-analog conversion on second digital signals to generate first analog signals, the second digital signals being obtained by adding the digital calibration signal to each of a plurality of first digital signals, the first digital signals each corresponding to respective one of the antenna elements; performing reception processing including analog-to-digital conversion on the first analog signals to generate third digital signals each corresponding to respective one of the antenna elements, the first analog signals each passing through respective one of the antenna elements; performing correlation calculation between the digital calibration signal and each of the third digital signals to calculate transmission delay characteristics each corresponding to respective one of the antenna elements; calculating transmission delay correction amounts based on the transmission delay characteristics, each of the transmission delay correction amounts corresponding to respective one of the antenna elements; and correcting the transmission delay characteristics based on the transmission delay correction amounts.

A reception method according to an exemplary embodiment of the present disclosure is performed by a receiver including a plurality of antenna elements. The reception method includes: generating a digital calibration signal; performing transmission processing including digital-to-analog conversion on the digital calibration signal to generate a first analog signal; performing reception processing including analog-to-digital conversion on third analog signals to generate first digital signals each corresponding to respective one of the antenna elements, the third analog signals being obtained by adding the first analog signal to each of a plurality of second analog signals, the second analog signals each received via corresponding one of the antenna elements; performing correlation calculation between the digital calibration signal and each of the first digital signals to calculate reception delay characteristics each corresponding to respective one of the antenna elements; calculating reception delay correction amounts based on the reception delay characteristics, each of the reception delay correction amounts corresponding to respective one of the antenna elements; and correcting the reception delay characteristics based on the reception delay correction amounts.

The above configuration enables delay calibration to be performed by a single correlation of only transmission (or only reception) after the transmission calibration signal (or the reception calibration signal) passes through the first reception processing execution unit (first transmission processing execution unit) that is dedicated to the calibration signal and that is different from the second reception processing execution unit (or the second transmission processing execution unit) for the reception signal (or the transmission signal). As a result, transmission and reception can be parallelized, and the delay calibration time can be shortened, so that high-performance beamforming can be achieved.

The transmitter and the receiver according to the present disclosure may be implemented in a HAPS, a base station on the ground, or a user terminal.

The present disclosure can be applied not only to the beamforming technology in the HAPS but also to the beamforming technology in wireless transmission.

What is claimed is:

1. A transmitter comprising:
   a plurality of antenna elements;
   a calibration signal generator which, in operation, generates a digital calibration signal;
   a transmission processing execution unit which, in operation, performs transmission processing including digital-to-analog conversion on second digital signals to generate first analog signals, the second digital signals being obtained by adding the digital calibration signal to each of a plurality of first digital signals, the first digital signals each corresponding to respective one of the antenna elements;
   a reception processing execution unit which, in operation, performs reception processing including analog-to-digital conversion on the first analog signals to generate third digital signals each corresponding to respective one of the antenna elements, the first analog signals each passing through respective one of the antenna elements;
   a transmission characteristics calculator which, in operation, performs correlation calculation between the digital calibration signal and each of the third digital signals to calculate transmission delay characteristics each corresponding to respective one of the antenna elements and which, in operation, calculates transmission delay correction amounts based on the transmission delay characteristics, each of the transmission delay correction amounts corresponding to respective one of the antenna elements; and
   a transmission characteristics corrector which, in operation, corrects the transmission delay characteristics based on the transmission delay correction amounts.

2. The transmitter according to claim 1, wherein the transmission characteristics calculator calculates the transmission delay characteristics by performing the correlation calculation to obtain early-late (E-L) correlation values.

3. The transmitter according to claim 1, wherein the transmission characteristics calculator calculates the transmission delay characteristics by performing the correlation calculation at a high-speed sampling rate.

4. The transmitter according to claim 1, wherein the transmission characteristics calculator calculates the transmission delay correction amounts to allow antenna elements other than a reference antenna element among the antenna elements to be identical in the transmission delay characteristics to the reference antenna element having a median delay among the antenna elements.

5. The transmitter according to claim 2, wherein
   the calibration signal generator adjusts an amount of delay of the digital calibration signal to allow a reference antenna element having a median delay among the antenna elements to have an E-L correlation value of 0, and
   the transmission characteristics calculator calculates the transmission delay correction amounts to allow the antenna elements other than the reference antenna element among the antenna elements to have E-L correlation values of 0.

6. The transmitter according to claim 4, wherein the reference antenna element is specified based on design information.

7. The transmitter according to claim 4, wherein the transmission characteristics calculator specifies the reference antenna element based on the transmission delay characteristics of all the antenna elements.

8. A receiver comprising:
   a plurality of antenna elements;
   a calibration signal generator which, in operation, generates a digital calibration signal;
   a transmission processing execution unit which, in operation, performs transmission processing including digital-to-analog conversion on the digital calibration signal to generate a first analog signal;
   a reception processing execution unit which, in operation, performs reception processing including analog-to-digital conversion on third analog signals to generate first digital signals each corresponding to respective one of the antenna elements, the third analog signals being obtained by adding the first analog signal to each of a plurality of second analog signals, the second analog signals each received via corresponding one of the antenna elements;
   a reception characteristics calculator which, in operation, performs correlation calculation between the digital calibration signal and each of the first digital signals to calculate reception delay characteristics each corresponding to respective one of the antenna elements and which, in operation, calculates reception delay correction amounts based on the reception delay characteristics, each of the reception delay correction amounts corresponding to respective one of the antenna elements; and
   a reception characteristics corrector which, in operation, corrects the reception delay characteristics based on the reception delay correction amounts.

9. The receiver according to claim 8, wherein the reception characteristics calculator calculates the reception delay characteristics by performing the correlation calculation to obtain E-L correlation values.

10. The receiver according to claim 8, wherein the reception characteristics calculator calculates the reception delay characteristics by performing the correlation calculation at a high-speed sampling rate.

11. The receiver according to claim 8, wherein the reception characteristics calculator calculates the reception delay correction amounts to allow the antenna elements other than a reference antenna element among the antenna elements to be identical in the reception delay characteristics to the reference antenna element having a median delay among the antenna elements.

12. The receiver according to claim 9, wherein
the calibration signal generator adjusts an amount of delay of the digital calibration signal to allow a reference antenna element having a median delay among the antenna elements to have an E-L correlation value of 0, and
the reception characteristics calculator calculates the reception delay correction amounts to allow the antenna elements other than the reference antenna element among the antenna elements to have E-L correlation values of 0.

13. The receiver according to claim 11, wherein the reference antenna element is specified based on design information.

14. The receiver according to claim 11, wherein the reception characteristics calculator specifies the reference antenna element based on the reception delay characteristics of all the antenna elements.

15. A transmission method performed by a transmitter including a plurality of antenna elements, the transmission method comprising:
generating a digital calibration signal;
performing transmission processing including digital-to-analog conversion on second digital signals to generate first analog signals, the second digital signals being obtained by adding the digital calibration signal to each of a plurality of first digital signals, the first digital signals each corresponding to respective one of the antenna elements;
performing reception processing including analog-to-digital conversion on the first analog signals to generate third digital signals each corresponding to respective one of the antenna elements, the first analog signals each passing through respective one of the antenna elements;
performing correlation calculation between the digital calibration signal and each of the third digital signals to calculate transmission delay characteristics each corresponding to respective one of the antenna elements;
calculating transmission delay correction amounts based on the transmission delay characteristics, each of the transmission delay correction amounts corresponding to respective one of the antenna elements; and
correcting the transmission delay characteristics based on the transmission delay correction amounts.

16. A reception method performed by a receiver including a plurality of antenna elements, the reception method comprising:
generating a digital calibration signal;
performing transmission processing including digital-to-analog conversion on the digital calibration signal to generate a first analog signal;
performing reception processing including analog-to-digital conversion on third analog signals to generate first digital signals each corresponding to respective one of the antenna elements, the third analog signals being obtained by adding the first analog signal to each of a plurality of second analog signals, the second analog signals each received via corresponding one of the antenna elements;
performing correlation calculation between the digital calibration signal and each of the first digital signals to calculate reception delay characteristics each corresponding to respective one of the antenna elements;
calculating reception delay correction amounts based on the reception delay characteristics, each of the reception delay correction amounts corresponding to respective one of the antenna elements; and
correcting the reception delay characteristics based on the reception delay correction amounts.

17. A non-transitory computer readable storage medium storing instructions, when executed by a processor, for causing a transmitter to execute the transmission method according to claim 15.

18. A non-transitory computer readable storage medium storing instructions, when executed by a processor, for causing a receiver to execute the reception method according to claim 16.

* * * * *